United States Patent
Kurata et al.

(10) Patent No.: US 10,110,825 B2
(45) Date of Patent: Oct. 23, 2018

(54) IMAGING APPARATUS, IMAGING METHOD, AND PROGRAM

(71) Applicant: Sony Semiconductor Solutions Corporation, Kanagawa (JP)

(72) Inventors: Koji Kurata, Tokyo (JP); Yasushi Sato, Kanagawa (JP); Seiji Kayashima, Kanagawa (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 0 days.

(21) Appl. No.: 15/534,679

(22) PCT Filed: Dec. 8, 2015

(86) PCT No.: PCT/JP2015/084390
§ 371 (c)(1),
(2) Date: Jun. 9, 2017

(87) PCT Pub. No.: WO2016/098641
PCT Pub. Date: Jun. 23, 2016

(65) Prior Publication Data
US 2017/0366723 A1   Dec. 21, 2017

(30) Foreign Application Priority Data
Dec. 18, 2014  (JP) ................... 2014-256045

(51) Int. Cl.
*H04N 5/235* (2006.01)
*G06T 3/40* (2006.01)
(Continued)

(52) U.S. Cl.
CPC ......... *H04N 5/2351* (2013.01); *G06T 3/4015* (2013.01); *H04N 9/735* (2013.01); *H04N 5/332* (2013.01)

(58) Field of Classification Search
CPC .... H04N 5/2351; H04N 5/2353; H04N 5/353; H04N 5/332; H04N 9/73; H04N 9/735; H04N 9/3182; G06T 3/4015
See application file for complete search history.

(56) References Cited

U.S. PATENT DOCUMENTS 9,699,429 B2 * 7/2017 Kaizu ................... H04N 9/735
2010/0283866 A1   11/2010 Numata
(Continued)

FOREIGN PATENT DOCUMENTS

| JP | 2008-289000 A | 11/2008 |
| JP | 2008-289001 A | 11/2008 |
| JP | 2013-219705 A | 10/2013 |

OTHER PUBLICATIONS

Written Opinion and English translation thereof dated Mar. 1, 2016 in connection with International Application No. PCT/JP2015/084390.
(Continued)

*Primary Examiner* — Nelson D. Hernández Hernández
(74) *Attorney, Agent, or Firm* — Wolf, Greenfield & Sacks, P.C.

(57) ABSTRACT

The present disclosure relates to an imaging apparatus, an imaging method, and a program that enable exposure control on a captured image in a non-Bayer pattern by an exposure control method designed for captured images in Bayer patterns.
When a Bayering process is performed on a captured image in an RGBW pixel array, a level correction unit corrects the signal level of the captured image so that an earlier level that is the signal level of each white pixel with the highest sensitivity in the captured image prior to the Bayering process becomes equal to a later level that is the signal level of each green pixel to be used in exposure control on an image in a Bayer pattern that is the RGB image after the
(Continued)

Bayering process. The present disclosure can be applied to imaging apparatuses, for example.

10 Claims, 19 Drawing Sheets

(51) Int. Cl.
  *H04N 9/73* (2006.01)
  *H04N 5/33* (2006.01)

(56) References Cited

U.S. PATENT DOCUMENTS

| | | | | |
|---|---|---|---|---|
| 2011/0050918 A1* | 3/2011 | Tachi | .................... | H04N 5/217 348/208.4 |
| 2013/0272605 A1* | 10/2013 | Saito | ...................... | G06T 5/002 382/167 |
| 2017/0257584 A1* | 9/2017 | Fujita | .................. | H04N 5/3675 |

OTHER PUBLICATIONS

International Preliminary Report on Patentability and English translation thereof dated Jun. 29, 2017 in connection with International Application No. PCT/JP2015/084390.

* cited by examiner

FIG. 3

|  |  |  |  |
|---|---|---|---|
| B | G | B | G |
| G | R | G | R |
| B | G | B | G |
| G | R | G | R |

B

|  |  |  |  |
|---|---|---|---|
| G+IR | W+IR | G+IR | W+IR |
| W+IR | R+IR | W+IR | B+IR |
| G+IR | W+IR | G+IR | W+IR |
| W+IR | B+IR | W+IR | R+IR |

A

IMAGING APPARATUS, IMAGING METHOD, AND PROGRAM

TECHNICAL FIELD

The present disclosure relates to imaging apparatuses, imaging methods, and programs, and more particularly, to an imaging apparatus, an imaging method, and a program that enable exposure control on a captured image in a non-Bayer pattern by an exposure control method designed for captured images in Bayer patterns.

BACKGROUND ART

For an image sensor having an RGBW pixel array, a technique has been suggested to capture an image corresponding to light that is input through an optical band separation filter that passes both near-infrared light as invisible light and visible light, and separate the invisible light component and the visible light component from the captured image (see Patent Document 1, for example). To separate the invisible light component and the visible light component with high precision in such an image sensor, it is necessary to perform appropriate exposure control.

In view of this, there has been a suggested technique by which integrators are provided in the stages before and after the separation, and the output from one of the integrators is selectively used in accordance with the amount of the invisible light component. In this manner, exposure control (automatic exposure (AE) control) and white balance control (automatic white balance (AWB) control) are performed (see Patent Document 2, for example).

CITATION LIST

Patent Documents

Patent Document 1: Japanese Patent Application Laid-Open No. 2008-289000
Patent Document 2: Japanese Patent Application Laid-Open No. 2008-289001

SUMMARY OF THE INVENTION

Problems to be Solved by the Invention

However, in a case where exposure control is performed by a method greatly different from an exposure control method designed for captured images in Bayer patterns, like the exposure control method disclosed in patent Document 2, exposure control cannot be performed by an exposure control unit designed for captured images in existing Bayer patterns. Therefore, a new exposure control unit needs to be developed and installed, which will lead to higher production costs.

In view for this, there is a demand for exposure control to be performed on a captured image in a non-Bayer pattern, such as a captured image in an RGBW pixel array containing an invisible light component and a visible light component, by an exposure control method designed for captured images in Bayer patterns.

The present disclosure is being made in view of those circumstances, and aims to enable exposure control on a captured image in a non-Bayer pattern by an exposure control method designed for captured images in Bayer patterns.

Solutions to Problems

An imaging apparatus according to one aspect of the present disclosure is an imaging apparatus that includes a level correction unit that corrects the signal level of a captured image in a non-Bayer pattern when a Bayering process is performed on the captured image, so that an earlier level that is the signal level of a pixel with the highest sensitivity in the captured image prior to the Bayering process becomes equal to a later level that is the signal level of a pixel to be used in exposure control on an image in a Bayer pattern that is the captured image after the Bayering process.

An imaging method and a program according to the one aspect of the present disclosure are compatible with the imaging apparatus according to the one aspect of the present disclosure.

In the one aspect of the present disclosure, when a Bayering process is performed on a captured image in a non-Bayer pattern, the signal level of the captured image is corrected so that an earlier level that is the signal level of a pixel with the highest sensitivity in the captured image prior to the Bayering process becomes equal to a later level that is the signal level of a pixel to be used in exposure control on an image in a Bayer pattern that is the captured image after the Bayering process.

Effects of the Invention

According to one aspect of the present disclosure, imaging can be performed. According to the one aspect of the present disclosure, it is also possible to perform exposure control on a captured image in a non-Bayer pattern by an exposure control method designed for captured images in Bayer patterns.

It should be noted that effects of the present technology are not limited to the effects described above, and may include any of the effects described in the present disclosure.

BRIEF DESCRIPTION OF DRAWINGS

FIG. 3 is a diagram for explaining the pixel array in an image before and after a Bayering process.

MODES FOR CARRYING OUT THE INVENTION

The following is a description of modes (hereinafter referred to as embodiments) for carrying out the present disclosure. It should be noted that explanation will be made in the following order.

1. First embodiment: imaging system (FIGS. 1 through 13)
2. Second embodiment: imaging system (FIGS. 14 through 17)
3. Other examples of non-Bayer patterns (FIG. 18)
4. Third embodiment: computer (FIG. 19)

First Embodiment (Example Configuration of a First Embodiment of an Imaging Apparatus)

Figure 1:
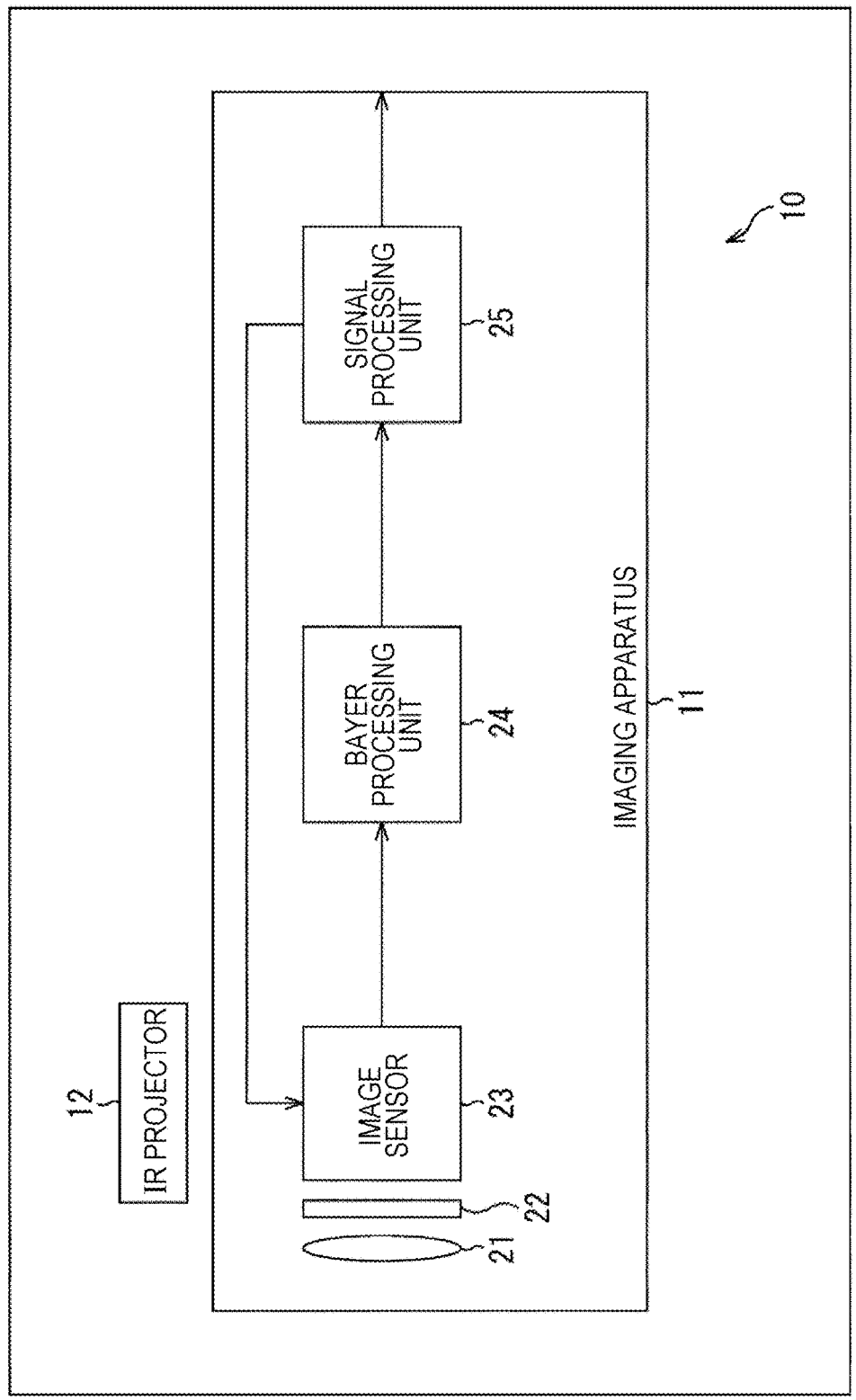
FIG. 1 is a block diagram showing an example configuration of a first embodiment of an imaging system that includes an imaging apparatus to which the present disclosure is applied.

FIG. 1 is a block diagram showing an example configuration of a first embodiment of an imaging system that includes an imaging apparatus to which the present disclosure is applied.

The imaging system 10 in FIG. 1 includes an imaging apparatus 11 and an infrared (IR) projector 12. An image corresponding to infrared light and visible light reflected by an object is captured by the imaging system 10.

Specifically, the imaging apparatus 11 includes a lens 21, an optical filter 22, an image sensor 23, a Bayer processing unit 24, and a signal processing unit 25.

Light from the object enters the lens 21 of the imaging apparatus 11. The lens 21 gathers the incident light onto the image sensor 23 via the optical filter 22. The optical filter 22 passes infrared light and visible light in the incident light. It should be noted that the optical filter 22 may not be provided.

The image sensor 23 is a complementary metal oxide semiconductor (CMOS) image sensor or a charge coupled device (CCD) image sensor, and includes pixels in an RGBW; pixel array. For each pixel, the image sensor 23 receives light in the colors (red (R), green (G), blue (B), and white (W)) corresponding to the pixel in the incident infrared light and visible light, and generates an electrical signal as a pixel signal in accordance with the amount of the received light. By doing so, the image sensor 23 performs imaging. Therefore, the pixel signals of the respective pixels obtained as a result of imaging contain an infrared component as an invisible light components and visible light components. The image sensor 23 supplies the pixel signals of the respective pixels obtained as a result of imaging, as a captured image to the Bayer processing unit 24.

The Bayer processing unit 24 performs a Bayering process (a remosaicing process) on the captured image in a non-Bayer pattern supplied from the image sensor 23, and generates an RGB image in a Bayer pattern (an RGB pixel array). The Bayer processing unit 24 supplies the generated RGB image in a Bayer pattern to the signal processing unit 25.

The signal processing unit 25 is a signal processing unit designed for captured images in existing Bayer patterns. Using the RGB image supplied from the Bayer processing unit 24, the signal processing unit 25 performs signal processing, such as an exposure control process, a white balance control process, and a YCbCr conversion process, by the same methods as methods designed for captured images in Bayer patterns. The signal processing unit 25 supplies the image sensor 23 with shutter gain indicating the exposure obtained as a result of the exposure control process, and thus, controls the exposure of the captured image. The signal processing unit 25 also outputs a YCbCr image obtained as a result of the white balance control process and the YCbCr conversion process performed on the RGB image.

The IR projector 12 emits infrared light toward the object at nighttime with little visible light, for example.

(Example of Transmittance of Light of Respective Wavelengths at the Optical Filter)

Figure 2:
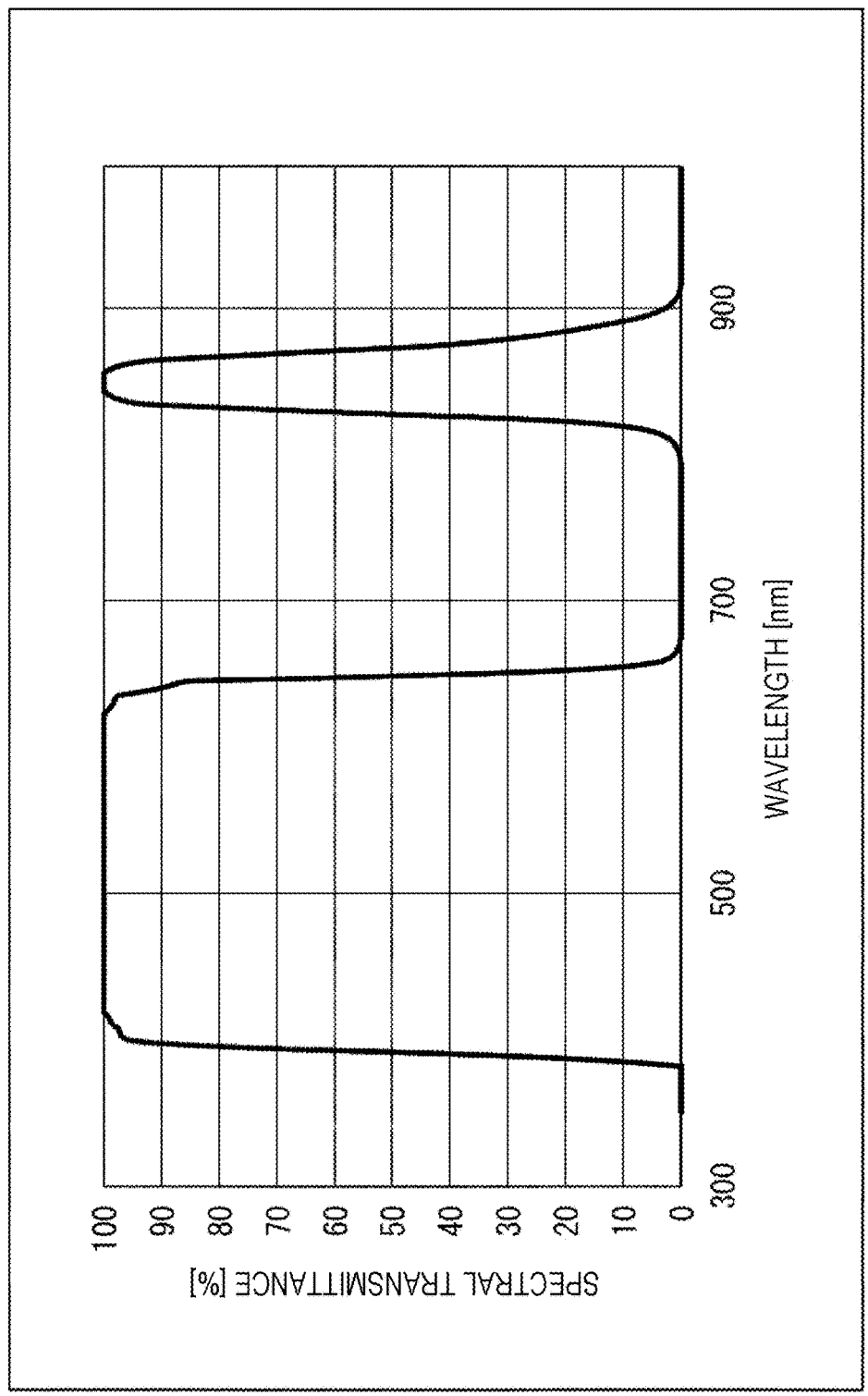
FIG. 2 is a graph showing an example of transmittance of light of respective wavelengths at the optical filter shown in FIG. 1.

FIG. 2 is a graph showing an example of transmittance of light of respective wavelengths at the optical filter 22 in FIG. 1.

In the graph in FIG. 2, the abscissa axis indicates wavelength (nm) of light passing through the optical filter 22, and the ordinate axis indicates transmittance (%) of the light.

As shown in FIG. 2, at the optical filter 22, the transmittance of visible light of approximately 390 to 660 nm in wavelength and the transmittance of infrared light of approximately 820 to 910 nm in wavelength are higher than 0%. Accordingly, visible light of approximately 390 to 660 nm in wavelength and infrared light of approximately 820 to 910 nm in wavelength passes through the optical filter 22.

(Explanation of the Pixel Array in an Image Before and After a Bayering Process)

FIG. 3 is a diagram for explaining the pixel array in an image before and after a Bayering process by the Bayer processing unit 24 shown in FIG. 1.

As shown in A of FIG. 3, the pixel array in an image prior to a Bayering process, or a captured image output from the image sensor 23, is an RGBW pixel array. Also, the pixel signals of the respective pixels contain infrared (IR) components.

The Bayer processing unit 24 performs a Bayering process on such an image yet to be subjected to a Bayering process, and generates an image having the RGB pixel array shown in B of FIG. 3 as an image subjected to a Bayering process.

(Example Configuration of the Bayer Processing Unit)

Figure 4:
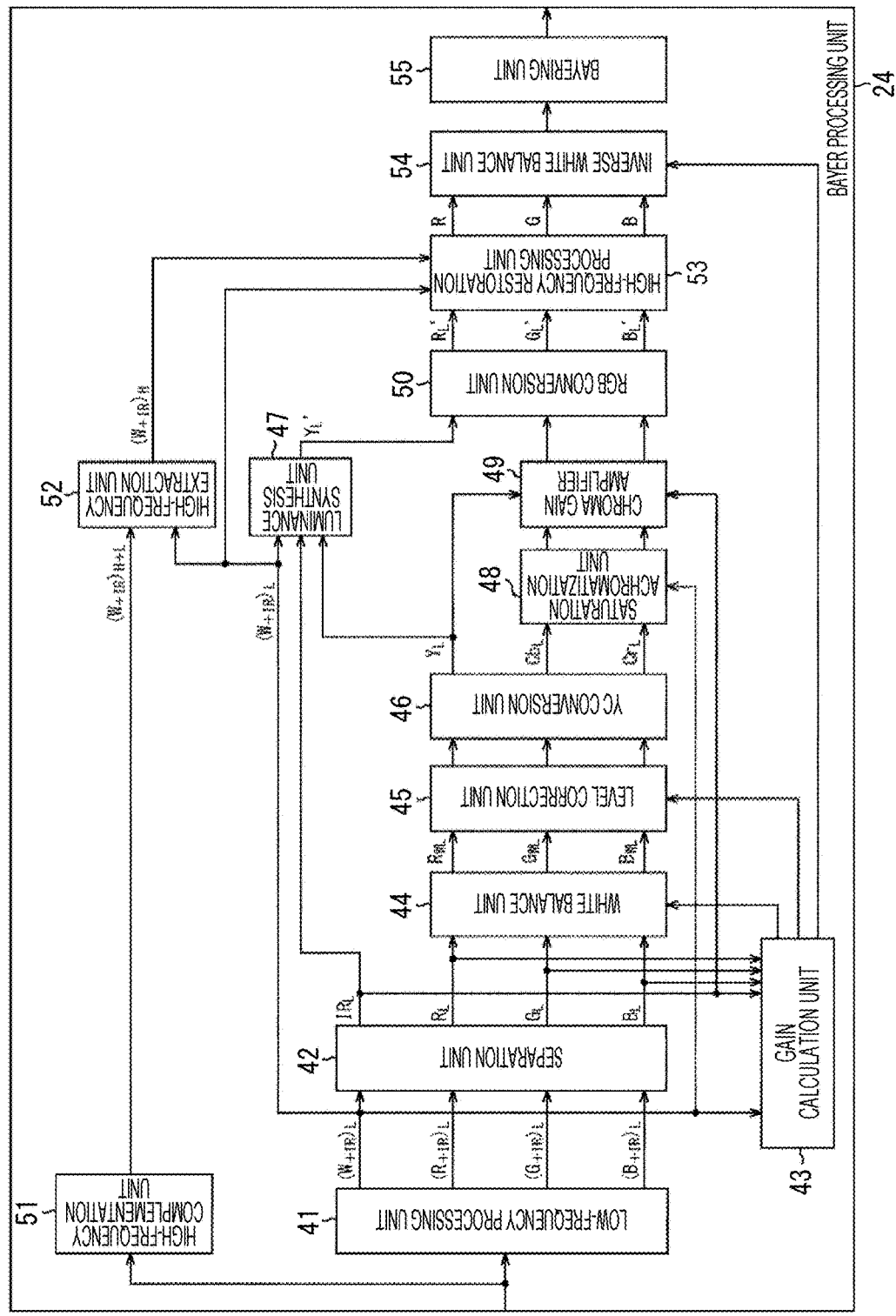
FIG. 4 is a block diagram showing an example configuration of the Bayer processing unit shown in FIG. 1.

FIG. 4 is a block diagram showing an example configuration of the Bayer processing unit 24 shown in FIG. 1.

The Bayer processing unit 24 includes a low-frequency processing unit 41, a separation unit 42, a gain calculation unit 43, a white balance unit 44, a level correction unit 45, a YC conversion unit 46, a luminance synthesis unit 47, a saturation achromatization unit 48, a chroma gain amplifier 49, an RGB conversion unit 50, a high-frequency complementation unit 51, a high-frequency extraction unit 52, a high-frequency restoration processing unit 53, an inverse white balance unit 54, and a Bayering unit 55. The Bayer processing unit 24 divides a captured image supplied from the image sensor 23 in FIG. 1 into high-frequency components and low-frequency components, and then performs a Bayering process.

Specifically, for each color of the pixels of the image sensor 23, the low-frequency processing unit 41 of the Bayer processing unit 24 performs a low pass filter (LPF) process and a complementation process on the captured image supplied from the image sensor 23. The low-frequency processing unit 41 supplies the separation unit 42 with the resultant low-frequency components $(W_{+IR})_L$, $(R_{+IR})_L$, $(G_{+IR})_L$, and $(B_{+IR})_L$ of the pixel signals of the respective colors of the same time among all the pixels containing an infrared component, and supplies the low-frequency component $(W_{+IR})_L$ to the gain calculation unit 43, the luminance synthesis unit 47, the high-frequency extraction unit 52, and the high-frequency restoration processing unit 53.

In accordance with the low-frequency components $(W_{+IR})_L$, $(R_{+IR})_L$, $(G_{+IR})_L$, and $(B_{+IR})_L$ supplied from the low-frequency processing unit 41, the separation unit 42 separates the infrared component and the visible light components contained in the respective low-frequency components $(R_{+IR})_L$, $(G_{+IR})_L$, and $(B_{+IR})_L$ as shown below in the mathematical expression (1).

[Mathematical Formula 1]

$$[\{(R_{+IR})_L(G_{+IR})_L(B_{+1})_L\} - (W_{+IR})_L]/2 = IR_L$$

$$(R_{+IR})_L - IR_L = R_L$$

$$(G_{+IR})_L - IR_L = G_L$$

$$(B_{+IR})_L - IR_L = B_L \quad (1)$$

It should be noted that $IR_L$ represents the infrared component contained in each of the low-frequency components $(R_{+IR})_L$, $(G_{+IR})_L$, and $(B_{+IR})_L$. Also, $R_L$, $G_L$, and $B_L$ represent the visible light components in the low-frequency components $(R_{+IR})_L$, $(G_{+IR})_L$, and $(B_{+IR})_L$.

The separation unit 42 supplies the gain calculation unit 43 with the infrared component $IR_L$ and the visible light components $R_L$, $G_L$, and $B_L$ obtained as a result of the separation, and supplies the white balance unit 44 with the visible light components $R_L$, $G_L$, and $B_L$.

In accordance with the visible light components $R_L$, $G_L$, and $B_L$ supplied from the separation unit 42, the gain calculation unit 43 (the white balance gain calculation unit) calculates white balance gains $C_{WR}$, $C_{WG}$, and $C_{WB}$ of the visible light components $R_L$, $G_L$, and $B_L$ as shown below in the mathematical expression (2), and supplies these white balance gains to the white balance unit 44.

[Mathematical Formula 2]

$$C_{WR} = \frac{AveG_L}{AveR_L} \quad (2)$$

$$C_{WG} = 1$$

$$C_{WB} = \frac{AveG_L}{AveB_L}$$

It should be noted that $AveR_L$, $AveG_L$, and $AveB_L$ represent the average values of the visible light components $R_L$, $G_L$, and $B_L$, respectively, in one screen. The gain calculation unit 43 also calculates the reciprocals of the white balance gains $C_{WR}$, $C_{WG}$, and $C_{WB}$, and supplies the reciprocals to the inverse white balance unit 54.

The gain calculation unit 43 (the correction gain calculation unit) further calculates a correction gain $C_E$ as shown below in the mathematical expression (3), in accordance with (the signal level of) the visible light component $G_L$ of each green pixel to be used in the exposure control on the captured image in a Bayer pattern (the later level), and (the signal level of) the low-frequency component $(W_{+IR})_L$ that is supplied from the low-frequency processing unit 41 and is of each white pixel with the highest sensitivity in the captured image (the earlier level).

[Mathematical Formula 3]

$$C_E = \frac{Ave(W_{+IR})_L}{AveG_L} \quad (3)$$

It should be noted that $Ave(W_{+IR})_L$ represents the average value of the low-frequency component $(W_{+IR})_L$ in one screen. According to the mathematical expression (3), the correction gain $C_E$ for turning (the average value of) the visible light component $G_L$ into (the average value of) the low-frequency component $(W_{+IR})_L$ is calculated. Accordingly, the visible light component $G_L$ is multiplied by the correction gain $C_E$, so that the visible light component $G_L$ after the multiplication becomes the same as the low-frequency component $(W_{+IR})_L$. The gain calculation unit 43 supplies the correction gain $C_E$ to the level correction unit 45.

As shown below in the mathematical expression (4), the white balance unit 44 multiplies the visible light components $R_L$, $G_L$, and $B_L$ supplied from the separation unit 42, by the respective white balance gains $C_{WR}$, $C_{WG}$, and $C_{WB}$ supplied from the gain calculation unit 43. As a result, the ratio (white balance) among the visible light components $R_L$, $G_L$, and $B_L$ is corrected.

[Mathematical Formula 4]

$$R_{WL} = R_L \times C_{WR}$$

$$G_{WL} = G_L \times C_{WG}$$

$$B_{WL} = B_L \times C_{WB} \quad (4)$$

It should be noted that $R_{WL}$, $G_{WL}$, and $B_{WL}$ are the corrected visible light components $R_L$, $G_L$, and $B_L$, respectively. The white balance unit 44 supplies the level correction unit 45 with the corrected visible light components $R_{WL}$, $G_{WL}$, and $B_{WL}$.

The level correction unit 45 corrects the visible light components $R_{WL}$, $G_{WL}$, and $B_{WL}$ by multiplying the respective visible light components $R_{WL}$, $G_{WL}$, and $B_{WL}$ from the white balance unit 44 by the correction gain $C_E$ from the gain calculation unit 43, so that the pixel signal of each green pixel in the RGB image subjected to the Bayering process becomes the same as the low-frequency component $(W_{+IR})_L$. The level correction unit 45 supplies the YC conversion unit 46 with the corrected visible light components $R_{WL}$, $G_{WL}$, and $B_{WL}$.

As shown below in the mathematical expression (5), the YC conversion unit 46 converts the visible light components $R_{WL}$, $G_{WL}$, and $B_{WL}$ supplied from the level correction unit 45, into a luminance signal $Y_L$ and color-difference signals $Cb_L$ and $Cr_L$. The YC conversion unit 46 supplies the luminance signal $Y_L$ to the luminance synthesis unit 47, and supplies the color-difference signals $Cb_L$ and $Cr_L$ to the saturation achromatization unit 48.

[Mathematical Formula 5]

$$Y_L = 0.299 \times R_{WL} + 0.587 \times G_{WL} + 0.114 \times B_{WL}$$

$$Cb_L = 0.168736 \times R_{WL} - 0.331264 \times G_{WL} + 0.5 \times B_{WL}$$

$$Cr_L = 0.5 \times R_{WL} - 0.418688 \times G_{WL} - 0.081312 \times B_{WL} \quad (5)$$

In accordance with the low-frequency component $(W_{+IR})_L$ supplied from the low-frequency processing unit 41, the luminance synthesis unit 47 corrects the luminance signal $Y_L$ supplied from the YC conversion unit 46, as shown below in the mathematical expression (6).

[Mathematical Formula 6]

$$Y_L' = aY_L + (1-a)(W_{+IR})_L \quad (6)$$

It should be noted that "a" is the coefficient determined in accordance with the luminance signal $Y_L$ and the infrared component $IR_L$. For example, in a case where the average value of the luminance signal $Y_L$ in one screen is greater than a predetermined value, or where the average value of the infrared component $IR_L$ in one screen is smaller than a predetermined value, the coefficient "a" is set at a relatively great value. In a case where the average value of the luminance signal $Y_L$ in one screen is equal to or smaller than the predetermined value, or where the average value of the infrared component $IR_L$ in one screen is equal to or greater than the predetermined value, on the other hand, the coefficient "a" is set at a relatively small value.

Meanwhile, $Y_L'$ represents the corrected luminance signal. The luminance synthesis unit 47 supplies the corrected luminance signal $Y_L'$ to the RGB conversion unit 50.

The saturation achromatization unit 48 determines whether the low-frequency component $(W_{+IR})_L$ exceeds a saturation level that is the highest level of the pixel signal corresponding to the charge that can be accumulated in a pixel. If the low-frequency component $(W_{+IR})_L$ exceeds the saturation level, the saturation achromatization unit 48 multiplies the color-difference signals $Cb_L$ and $Cr_L$ supplied from the YC conversion unit 46 by a gain that is smaller than 1, and thus performs achromatization.

That is, when one of the low-frequency components $(W_{+IR})_L$, $(R_{+IR})_L$, $(G_{+IR})_L$, and $(B_{+IR})_L$ exceeds the saturation level, the degree of precision of the separation conducted by the separation unit 42 becomes lower, and the degree of precision of the color-difference signals $Cb_L$ and $Cr_L$ also becomes lower. Therefore, if the low-frequency component $(W_{+IR})_L$ of the white pixel with the highest sensitivity exceeds the saturation level, the saturation achromatization unit 48 determines that one of the low-frequency components $(W_{+IR})_L$, $(R_{+IR})_L$, $(G_{+IR})_L$, and $(B_{+IR})_L$ exceeds the saturation level, and lowers the color-difference signals $Cb_L$ and $Cr_L$. The saturation achromatization unit 48 supplies the chroma gain amplifier 49 with the color-difference signal $Cb_L$ and $Cr_L$ after the achromatization.

If the low-frequency component $(W_{+IR})_L$ does not exceed the saturation level, on the other hand, the saturation achromatization unit 48 supplies the chroma gain amplifier 49 with the color-difference signals $Cb_L$ and $Cr_L$ as they are supplied from the YC conversion unit 46.

The chroma gain amplifier 49 multiplies the respective color-difference signals $Cb_L$ and $Cr_L$ supplied from the saturation achromatization unit 48 by a chroma gain. In a case where the average value of the luminance signal $Y_L$ in one screen is greater than a predetermined value, or where the average value of the infrared component $IR_L$ in one screen is smaller than a predetermined value, the chroma gain is set at 1. In a case where the average value of the luminance signal $Y_L$ in one screen is equal to or smaller than the predetermined value, or where the average value of the infrared component $IR_L$ in one screen is equal to or greater than the predetermined value, the chroma gain is set at a value close to 0.

Because of this, in a case where the amount of light from the object is large or the amount of infrared light is small, and the degree of precision of the color-difference signals $Cb_L$ and $Cr_L$ is high, the color-difference signals $Cb_L$ and $Cr_L$ are not corrected. In a case where the amount of light from the object is small or the amount of infrared light is large, and the degree of precision of the color-difference signals $Cb_L$ and $Cr_L$ is low, on the other hand, the color-difference signals $Cb_L$ and $Cr_L$ are lowered, and the low-frequency components are achromatized. As a result, the signal-to-noise (S/N) ratio of the image is increased after the Bayering process. The chroma gain amplifier 49 supplies the RGB conversion unit 50 with the color-difference signals $Cb_L$ and $Cr_L$ multiplied by the chroma gain.

As shown below in the mathematical expression (7), the RGB conversion unit 50 converts the luminance signal $Y_L'$ and the color-difference signals $Cb_L$ and $Cr_L$ supplied from the luminance synthesis unit 47 into red, green, and blue pixel signals $R_L'$, $G_L'$, and $B_L'$, and supplies these pixel signals to the high-frequency restoration processing unit 53.

[Mathematical Formula 7]

$$R_L' = Y_L' + 1.402 \times Cr_L$$

$$G_L' = Y_L' - 0.344136 \times Cb_L - 0.714136 \times Cr_L$$

$$B_L' = Y_L' + 1.772 \times Cb_L \quad (7)$$

In accordance with the captured image supplied from the image sensor 23, the high-frequency complementation unit 51 complements the pixel signal $(W_{+IR})_{H+L}$ containing the white visible light component and the infrared component of all the pixels. Specifically, the high-frequency complementation unit 51 sets the pixel signals of the white pixels in the captured image as the complemented pixel signals of the white pixels without any change. The high-frequency complementation unit 51 also sequentially turns the pixels other than the white pixels into target pixels, and generates the complemented pixel signal of each target pixel by calculating the average value of the pixel signals of the white pixels around the target pixel. The high-frequency complementation unit 51 supplies the complemented pixel signal $(W_{+IR})_{H+L}$ to the high-frequency extraction unit 52.

The high-frequency extraction unit 52 subtracts the low-frequency component $(W_{+IR})_L$ supplied from the low-frequency processing unit 41, from the pixel signal $(W_{+IR})_{H+L}$ supplied from the high-frequency complementation unit 51, and supplies the high-frequency restoration processing unit 53 with the resultant high-frequency component $(W_{+IR})_H$ of the white pixel signals of the same time among all the pixels.

In accordance with the low-frequency component $(W_{+IR})_L$ supplied from the low-frequency processing unit 41, the pixel signals $R_L'$, $G_L'$, and $B_L'$ supplied from the RGB conversion unit 50, and the high-frequency component $(W_{+IR})_H$ supplied from the high-frequency extraction unit 52, the high-frequency restoration processing unit 53 generates the red, green, and blue pixel signals R, G, and B of full band, as shown below in the mathematical expression (8). The high-frequency restoration processing unit 53 supplies the pixel signals R, G, and B to the inverse white balance unit 54.

[Mathematical Formula 8]

$$R = R_L' + (W_{+IR})_H \times R_L' \div (W_{+IR})_L$$

$$G = G_L' + (W_{+IR})_H \times G_L' \div (W_{+IR})_L$$

$$B = B_L' + (W_{+IR})_H \times B_L' \div (W_{+IR})_L \quad (8)$$

The inverse white balance unit 54 (the white balance control unit) multiplies the pixel signals R, G, and B supplied from the high-frequency restoration processing unit 53 by the reciprocals of the white balance gains $C_{WB}$, $C_{WG}$, and $C_{WB}$ supplied from the gain calculation unit 43. As a result, the white balance among the pixel signals R, G, and B is controlled so that the ratio among the average values of the signal levels of the red, green, and blue pixel signals in one screen of the captured image output from the image sensor 23 prior to the Bayering process becomes the same as the ratio among the average values of the signal levels of the red, green, and blue pixel signals in one screen of the RGB image output from the Bayer processing unit 24 after the Bayering process. The inverse white balance unit 54 supplies the Bayering unit 55 with the pixel signals R, G, and B having the white balance controlled.

For each pixel, the Bayering unit 55 extracts the pixel signal of the color assigned to the pixel in the Bayer pattern from the pixel signals R, G, and B supplied from the inverse white balance unit 54. The Bayering unit 55 supplies the signal processing unit 25 in FIG. 1 with the extracted pixel signals of the respective pixels as an RGB image in a Bayer pattern.

(Explanation of the Signal Levels of Output Signals)

Figure 5:
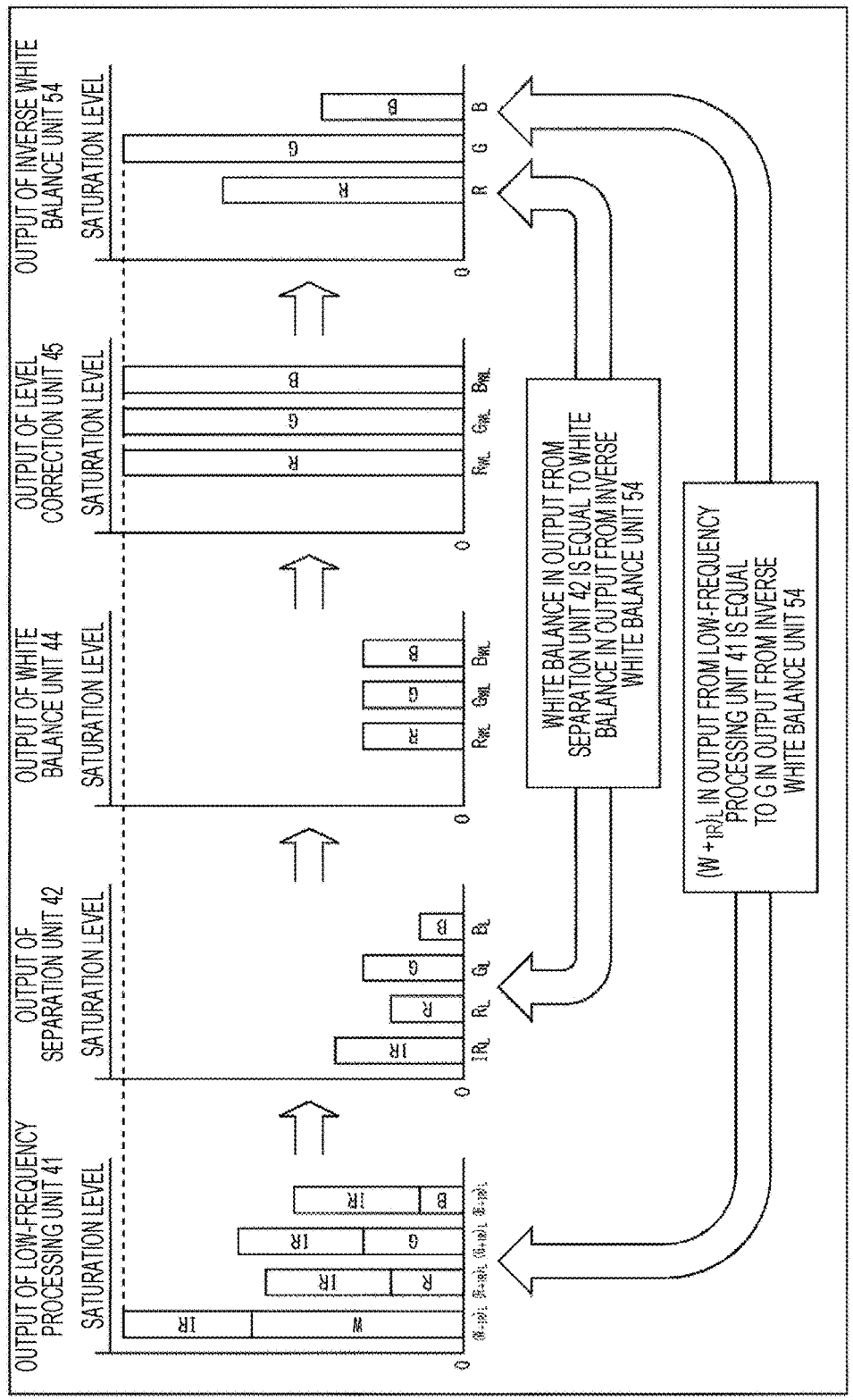
FIG. 5 is a conceptual diagram for explaining signal levels of output signals.

FIG. 5 is a conceptual diagram for explaining the signal levels of signals to be output from the low-frequency processing unit 41, the separation unit 42, the white balance unit 44, the level correction unit 45, and the inverse white balance unit 54.

As shown in FIG. 5, a low-frequency component $(W_{+IR})_L$ to be output from the low-frequency processing unit 41 is the low-frequency component of a pixel signal containing a white component (W) and an infrared component (IR), and a low-frequency component $(R_{+IR})_L$ is the low-frequency component of a pixel signal containing a red component (R) and an infrared component (IR). Also, a low-frequency component $(G_{+IR})_L$ is the low-frequency component of a pixel signal containing a green component (G) and an infrared component (IR), and a low-frequency component $(B_{+IR})_L$ is the low-frequency component of a pixel signal containing a blue component (B) and an infrared component (IR).

Among the pixels in the image sensor 23, the white pixels have the highest sensitivity, and accordingly, the signal level of the low-frequency component $(W_{+IR})_L$ is higher than the signal levels of the low-frequency components $(R_{+IR})_L$, $(G_{+IR})_L$, and $(B_{+IR})_L$.

The low-frequency components $(W_{+IR})_L$, $(R_{+IR})_L$, $(G_{+IR})_L$, and $(B_{+IR})_L$ are separated into an infrared component $IR_L$ and visible light components $R_L$, $G_L$, and $B_L$ at the separation unit 42 as shown in FIG. 5, and are then output. The white balance unit 44 multiplies the visible light components $R_L$, $G_L$, and $B_L$ by 1 as white balance gains $C_{WR}$ and $C_{WG}$, and $C_{WB}$, respectively, and then outputs the visible light components. As a result, the visible light components $R_{WL}$, $G_{WL}$, and $B_{WL}$ output from the white balance unit 44 become substantially the same, as shown in FIG. 5.

The level correction unit 45 multiplies each of the visible light components $R_{WL}$, $G_{WL}$, and $B_{WL}$ output from the white balance unit 44 by a correction gain $C_E$, and then outputs the visible light components. As a result, the visible light components $R_{WL}$, $G_{WL}$, and $B_{WL}$ output from the level correction unit 45 become the same as the low-frequency component $(W_{+IR})_L$, as shown in FIG. 5.

The inverse white balance unit 54 multiplies the visible light components $R_{WL}$, $G_{WL}$, and $B_{WL}$ output from the level correction unit 45 and the corresponding pixel signals R, G, and B by the reciprocals of the white balance gains $C_{WR}$ and $C_{WG}$, and $C_{WB}$, respectively, and then outputs the results. As a result, the white balance among the visible light components $R_L$, $G_L$, and $B_L$ output from the separation unit 42 becomes equal to the white balance among the pixel signals R, G, and B output from the inverse white balance unit 54. That is, the ratio among the visible light components $R_L$, $G_L$, and $B_L$, which has changed at the white balance unit 44, is returned to the original value.

Thus, in accordance with the RGB image in the Bayer pattern corresponding to the pixel signals R, G, and B, the signal processing unit 25 can perform white balance control on the captured image from the image sensor 23 by performing white balance control according to a white balance control method designed for captured images in Bayer patterns.

Further, at the level correction unit 45, the visible light components $R_{WL}$, $G_{WL}$, and $B_{WL}$ are made equal to the low-frequency component $(W_{+IR})_L$, and the reciprocal of the white balance gain $C_{WG}$ is 1. Accordingly, the low-frequency component $(W_{+IR})_L$ output from the low-frequency processing unit 41 is equal to the pixel signal G output from the inverse white balance unit 54. That is, the pixel signal G of each green pixel to be used in exposure control according to an exposure control method designed for captured images in Bayer patterns is made equal to the low-frequency component $(W_{+IR})_L$ of each white pixel with the highest sensitivity among the pixels in the image sensor 23.

Thus, in accordance with the pixel signal of each green pixel in the RGB image in the Bayer pattern corresponding to the pixel signals R, G, and B, the signal processing unit 25 can perform exposure control on the captured image from the image sensor 23 by performing exposure control according to an exposure control method designed for captured images in Bayer patterns.

As described above, in the imaging apparatus 11, exposure control and white balance control can be performed on a captured image from the image sensor 23 by an exposure control method and a white balance control method designed for captured images in Bayer patterns. Because of this, a new exposure control unit and a new white balance control unit do not need to be developed, but only the signal processing unit 25 designed for captured images in existing Bayer patterns is added to the imaging apparatus 11 so that exposure control and white balance control can be performed on a captured image from the image sensor 23. As a result, the production costs for the imaging apparatus 11 can be lowered.

(Effects of Exposure Control)

Figure 6:
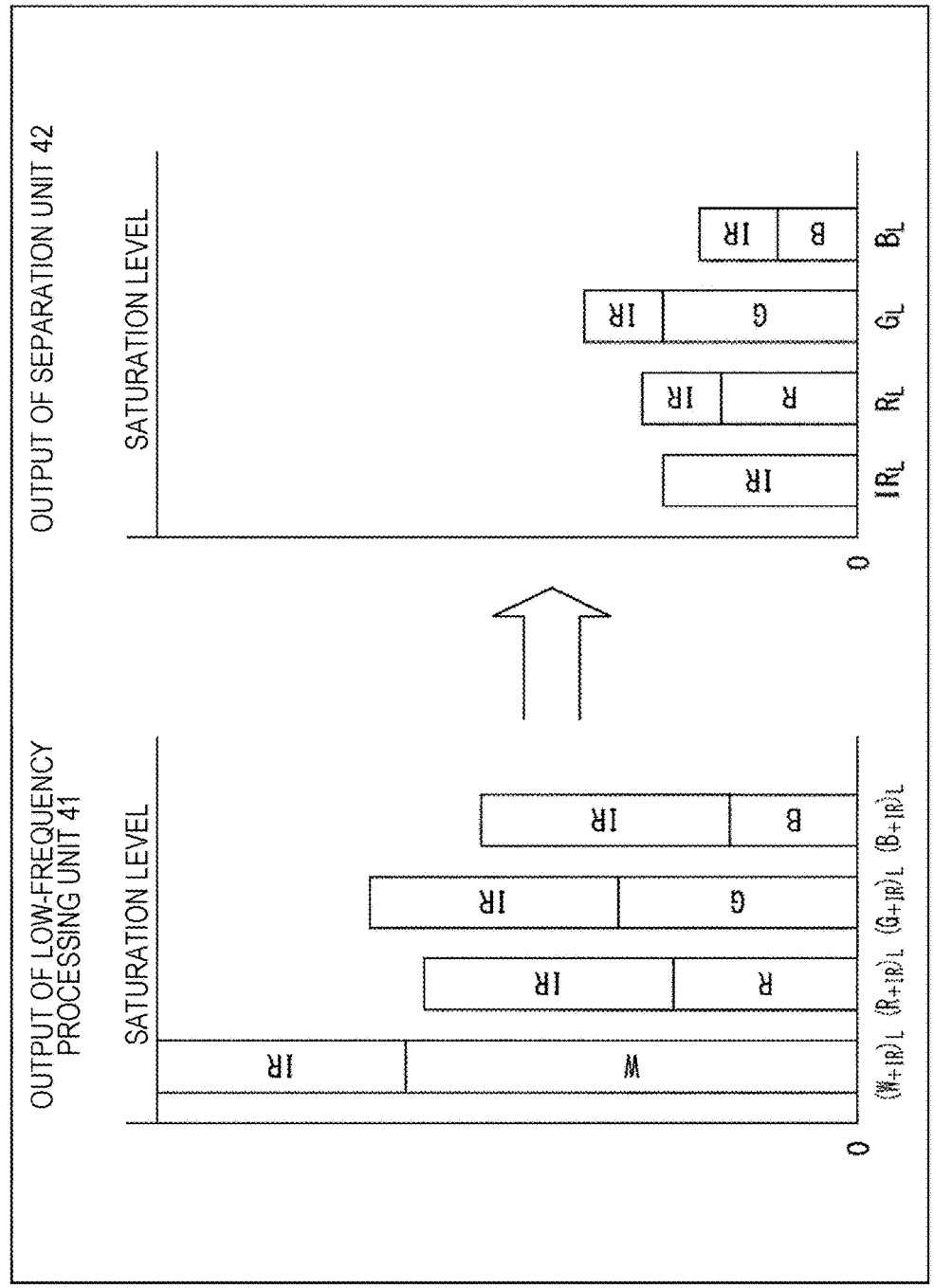
FIG. 6 is a graph showing output signals from the separation unit in a case where exposure control is not performed.
Figure 7:
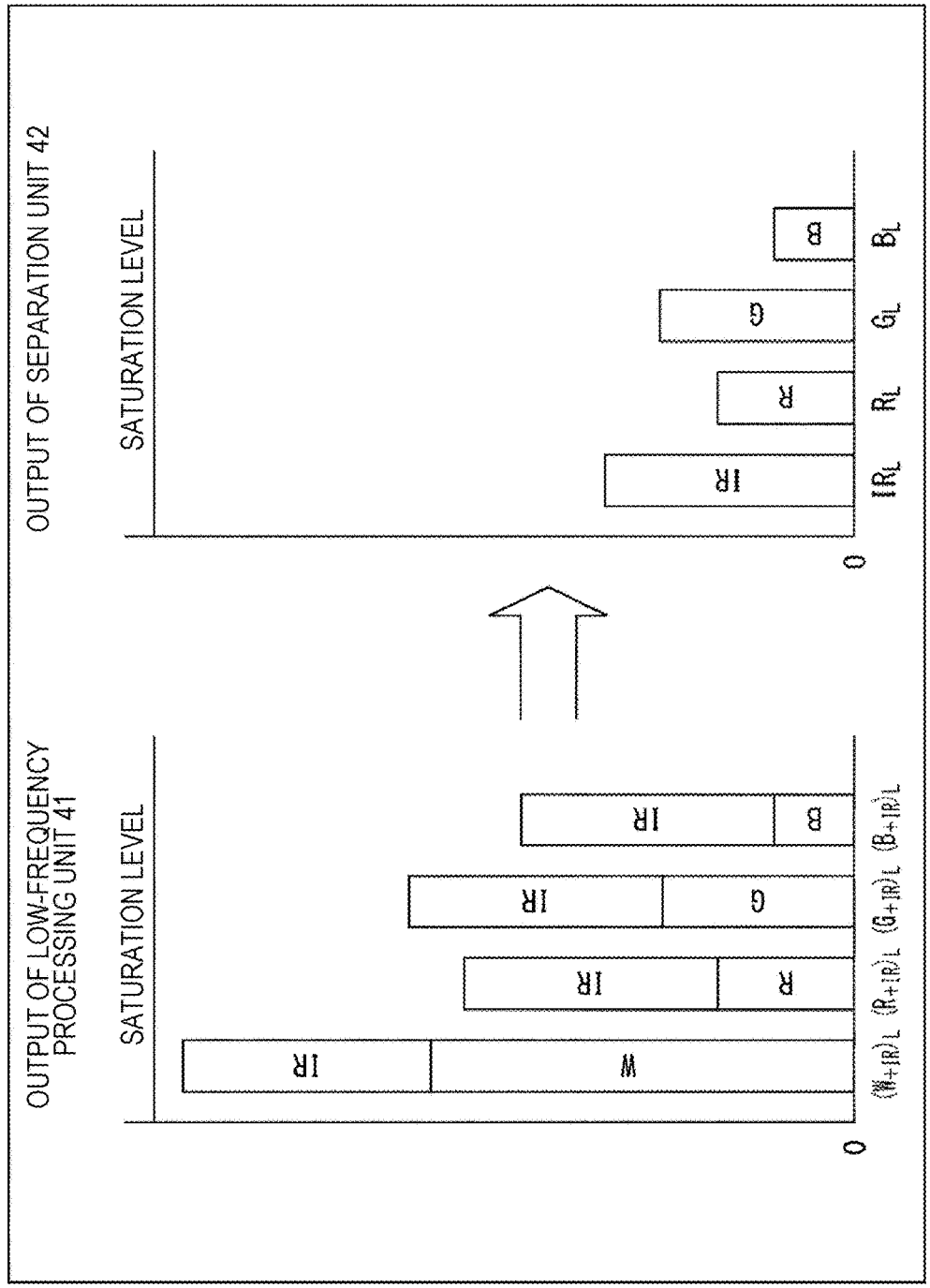
FIG. 7 is a graph showing output signals from the separation unit in a case where exposure control is performed.

FIG. 6 is a graph showing output signals from the separation unit 42 in a case where exposure control is not performed on a captured image from the image sensor 23. FIG. 7 is a graph showing output signals from the separation unit 42 in a case where exposure control is performed.

As shown in FIG. 6, if exposure control is not performed on a captured image from the image sensor 23, the low-frequency component $(W_{+IR})_L$ might exceed the saturation level. In such a case, the low-frequency component $(W_{+IR})_L$ becomes smaller than the low-frequency component of the pixel signal corresponding to the amount of light to be sensed by each white pixel. Therefore, the above mathematical expression (1) is not satisfied, and the infrared component $IR_L$ remains in the visible light components $R_L$, $G_L$, and $B_L$ after the separation.

In a case where exposure control is performed on a captured image from the image sensor 23, on the other hand, all the low-frequency components $(W_{+IR})_L$, $(R_{+IR})_L$, $(G_{+IR})_L$, and $(B_{+IR})$ do not exceed the saturation level, and the above mathematical expression (1) is satisfied. Accordingly, the infrared component $IR_L$ is not contained in the visible light components $R_L$, $G_L$, and $B_L$ after the separation. As a result, the quality of the RGB image after the Bayering process becomes higher than in a case where exposure control is not performed.

In the imaging apparatus 11, exposure control is performed on a captured image from the image sensor 23. Thus, the quality of the RGB image after the Bayering process becomes higher than in a case where exposure control is not performed.

(Explanation of a Process to be Performed by the Imaging Apparatus)

Figure 8:
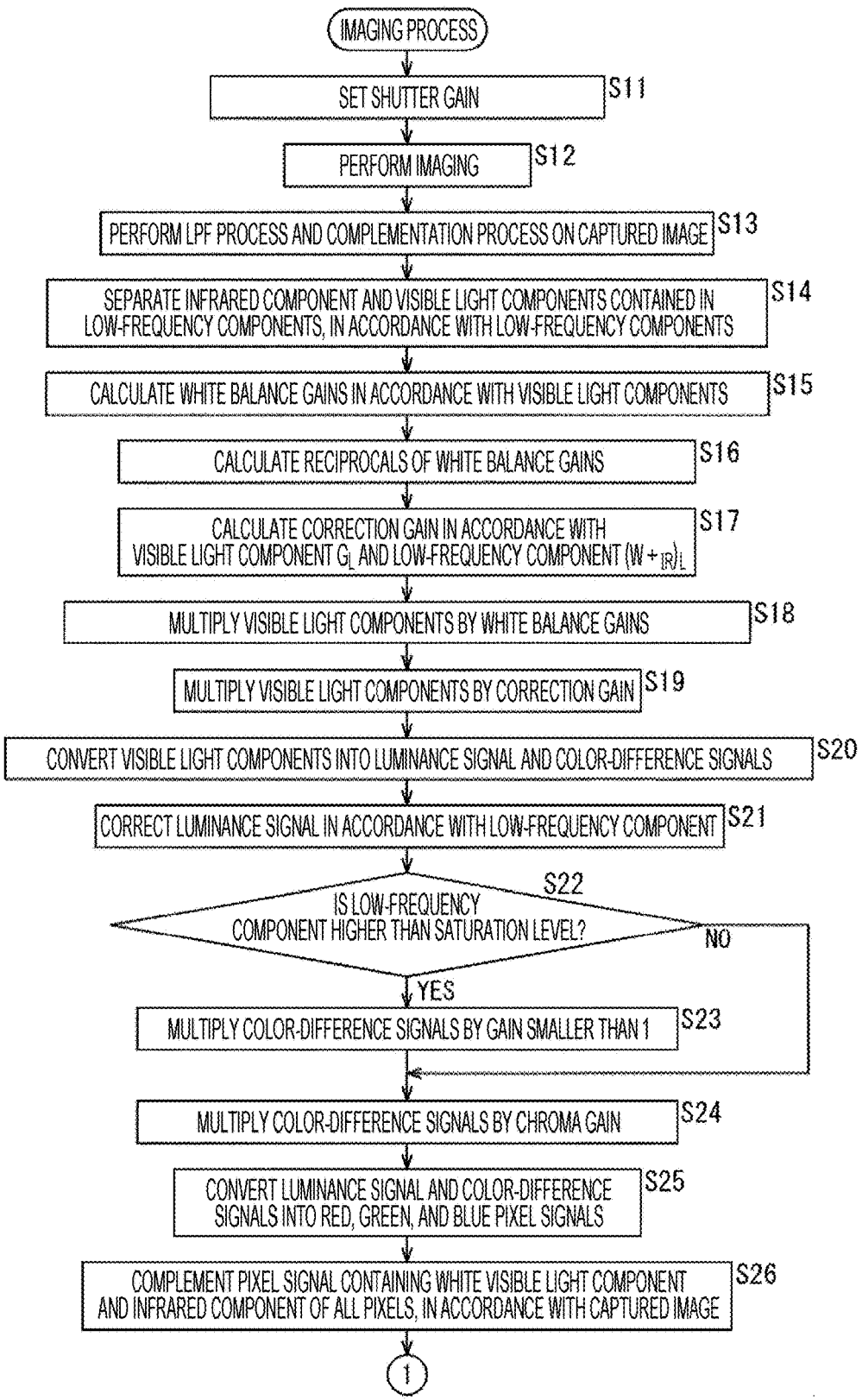
FIG. 8 is a flowchart for explaining an imaging process to be performed by the imaging apparatus shown in FIG. 1.
Figure 9:
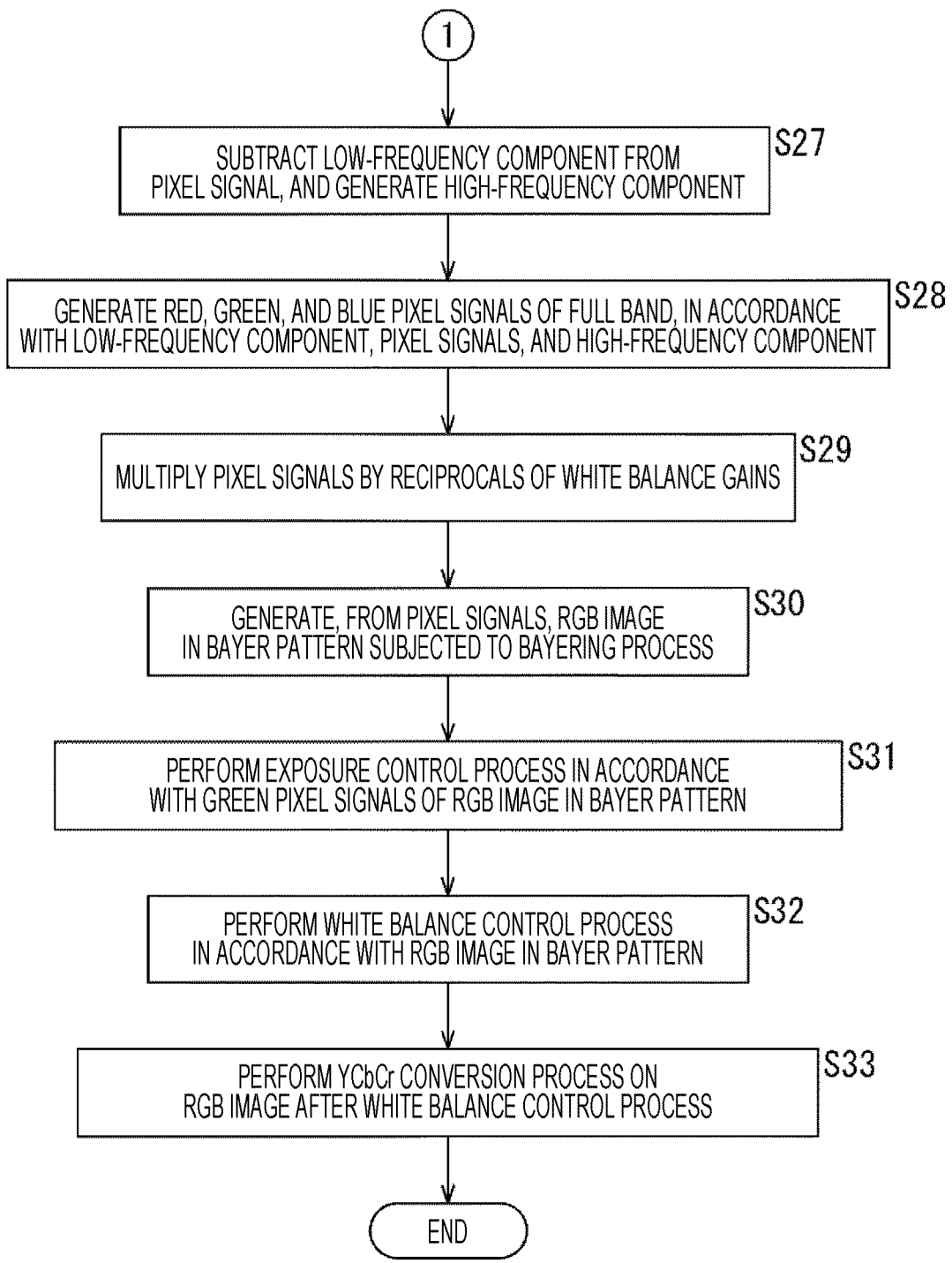
FIG. 9 is a flowchart for explaining the imaging process to be performed by the imaging apparatus shown in FIG. 1.

FIGS. 8 and 9 show a flowchart for explaining an imaging process to be performed by the imaging apparatus 11 shown in FIG. 1. This imaging process is to be performed for each captured image supplied from the image sensor 23, for example.

In step S11 in FIG. 8, the image sensor 23 sets the current shutter gain, which is the shutter gain supplied from the signal processing unit 25 during the imaging process for the previous captured image. It should be noted that, in the imaging process for the first captured image, any shutter gain has not been determined, and therefore, a preset default value of shutter gain is set as the current shutter gain in step S11, for example.

In step S12, the image sensor 23 performs imaging in accordance with the current shutter gain, and supplies the resultant captured image in a non-Bayer pattern to the Bayer processing unit 24.

In step S13, for each color of the pixels of the image sensor 23, the low-frequency processing unit 41 (FIG. 4) of the Bayer processing unit 24 performs an LPF process and a complementation process on the captured image supplied from the image sensor 23. The low-frequency processing unit 41 supplies the resultant low-frequency components $(W_{+IR})_L$, $(R_{+IR})_L$, $(G_{+IR})_L$, and $(B_{+IR})_L$ to the separation unit 42, and supplies the low-frequency component $(W_{+IR})_L$ to the gain calculation unit 43, the luminance synthesis unit 47, the high-frequency extraction unit 52, and the high-frequency restoration processing unit 53.

In step S14, in accordance with the low-frequency components $(W_{+IR})_L$, $(R_{+IR})_L$, $(G_{+IR})_L$, and $(B_{+IR})_L$ supplied from the low-frequency processing unit 41, the separation unit 42 separates the infrared component $IR_L$ and the visible light components $R_L$, $G_L$, and $B_L$ contained in the low-frequency components $(R_{+IR})_L$, $(G_{+IR})_L$, and $(B_{+IR})_L$ as shown in the above mathematical expression (1). The separation unit 42 supplies the infrared component $IR_L$ and the visible light components $R_L$, $G_L$, and $B_L$ to the gain calculation unit 43, and supplies the visible light components $R_L$, $G_L$, and $B_L$ to the white balance unit 44.

In step S15, in accordance with the visible light components $R_L$, $G_L$, and $B_L$ supplied from the separation unit 42, the gain calculation unit 43 calculates white balance gains $C_{WR}$, $C_{WG}$, and $C_{WB}$ as shown in the above mathematical expression (2), and supplies these white balance gains to the white balance unit 44.

In step S16, the gain calculation unit 43 also calculates the respective reciprocals of the white balance gains $C_{WR}$, $C_{WG}$, and $C_{WB}$, and supplies the reciprocals to the inverse white balance unit 54. In step S17, in accordance with the visible light component $G_L$ and the low-frequency component $(W_{+IR})_L$ supplied from the low-frequency processing unit 41, the gain calculation unit 43 calculates a correction gain $C_E$ as shown in the above mathematical expression (3). The gain calculation unit 43 supplies the correction gain $C_E$ to the level correction unit 45.

In step S18, as shown in the above mathematical expression (4), the white balance unit 44 multiplies the visible light components $R_L$, $G_L$, and $B_L$ supplied from the separation unit 42, by the respective white balance gains $C_{WR}$, $C_{WG}$, and $C_{WB}$ supplied from the gain calculation unit 43. The white balance unit 44 supplies the level correction unit 45 with the visible light components $R_{WL}$, $G_{WL}$, and $B_{WL}$ after the multiplication.

In step S19, the level correction unit 45 multiplies each of the visible light components $R_{WL}$, $G_{WL}$, and $B_{WL}$ by the correction gain $C_E$ supplied from the gain calculation unit 43. The level correction unit 45 supplies the YC conversion unit 46 with the visible light components $R_{WL}$, $G_{WL}$, and $B_{WL}$ after the multiplication.

In step S20, as shown in the above mathematical expression (5), the YC conversion unit 46 converts the visible light components $R_{WL}$, $G_{WL}$, and $B_{WL}$ supplied from the level correction unit 45, into a luminance signal $Y_L$ and color-difference signals $Cb_L$ and $Cr_L$. The YC conversion unit 46 supplies the luminance signal $Y_L$ to the luminance synthesis unit 47, and supplies the color-difference signals $Cb_L$ and $Cr_L$ to the saturation achromatization unit 48.

In step S21, in accordance with the low-frequency component $(W_{+IR})_L$ supplied from the low-frequency processing unit 41, the luminance synthesis unit 47 corrects the luminance signal $Y_L$ supplied from the YC conversion unit 46, as shown in the above mathematical expression (6), and then supplies the resultant luminance signal $Y_L'$ to the RGB conversion unit 50.

In step S22, the saturation achromatization unit 48 determines whether the low-frequency component $(W_{+IR})_L$ exceeds the saturation level. If the low-frequency component $(W_{+IR})_L$ is determined to be higher than the saturation level in step S22, the saturation achromatization unit 48 in step S23 multiplies the color-difference signals $Cb_L$ and $Cr_L$ supplied from the YC conversion unit 46 by a gain that is smaller than 1, and thus performs achromatization. The saturation achromatization unit 48 supplies the chroma gain amplifier 49 with the color-difference signal $Cb_L$ and $Cr_L$ after the achromatization, and advances the process to step S24.

If the low-frequency component $(W_{+IR})_L$ is determined not to be higher than the saturation level in step S22, on the other hand, the saturation achromatization unit 48 supplies the chroma gain amplifier 49 with the color-difference signals $Cb_L$ and $Cr_L$ as they are supplied from the YC conversion unit 46, and advances the process to step S24.

In step S24, the chroma gain amplifier 49 multiplies the respective color-difference signals $Cb_L$ and $Cr_L$ supplied from the saturation achromatization unit 48 by a chroma gain, and supplies the results to the RGB conversion unit 50.

In step S25, as shown in the above mathematical expression (7), the RGB conversion unit 50 converts the luminance signal $Y_L'$ and the color-difference signals $Cb_L$ and $Cr_L$ supplied from the luminance synthesis unit 47 into red, green, and blue pixel signals $R_L'$, $G_L'$, and $B_L'$, and supplies these pixel signals to the high-frequency restoration processing unit 53.

In step S26, in accordance with the captured image supplied from the image sensor 23, the high-frequency complementation unit 51 complements the pixel signal $(W_{+IR})_{H+L}$ containing the white visible light component and the infrared component of all the pixels, and supplies the result to the high-frequency extraction unit 52.

In step S27 in FIG. 9, the high-frequency extraction unit 52 subtracts the low-frequency component $(W_{+IR})_L$ supplied from the low-frequency processing unit 41, from the pixel signal $(W_{+IR})_{H+L}$ supplied from the high-frequency complementation unit 51, and thus, generates a high-frequency component $(W_{+IR})_H$. The high-frequency extraction unit 52 supplies the high-frequency component $(W_{+IR})_H$ to the high-frequency restoration processing unit 53.

In step S28, in accordance with the low-frequency component $(W_{+IR})_L$ from the low-frequency processing unit 41, the pixel signals $R_L'$, $G_L'$, and $B_L'$ from the RGB conversion unit 50, and the high-frequency component $(W_{+IR})_H$ from the high-frequency extraction unit 52, the high-frequency restoration processing unit 53 generates the red, green, and blue pixel signals R, G, and B of full band, as shown in the above mathematical expression (8). The high-frequency restoration processing unit 53 supplies the pixel signals R, G, and B to the inverse white balance unit 54.

In step S29, the inverse white balance unit 54 multiplies the respective pixel signals R, G, and B supplied from the high-frequency restoration processing unit 53 by the reciprocals of the white balance gains $C_{WR}$, $C_{WG}$, and $C_{WB}$ supplied from the gain calculation unit 43, and supplies the results to the Bayering unit 55.

In step S30, for each pixel, the Bayering unit 55 extracts the pixel signal of the color assigned to the pixel in the Bayer pattern from the pixel signals R, G, and B supplied from the inverse white balance unit 54. The Bayering unit 55 supplies the signal processing unit 25 in FIG. 1 with the extracted pixel signals of the respective pixels as an RGB image in a Bayer pattern subjected to the Bayering process.

In step S31, in accordance with the total sum (the value of integral) of the green pixel signals of the RGB image in the Bayer pattern supplied from the Bayering unit 55, the signal processing unit 25 performs an exposure control process to determine shutter gain so that the average value of the green pixel signals of the RGB image in one screen does not exceed the saturation level. The signal processing unit 25 supplies the determined shutter gain to the image sensor 23. Thus shutter gain is to be set as the current shutter gain in step S11 in the imaging process for the next captured image.

In step S32, the signal processing unit 25 performs a white balance control process to calculate the white balance gains of the respective colors in accordance with the total sums (the values of integral) of the pixel signals of the respective colors in the RGB image in the Bayer pattern, and multiply the pixel signals of the respective colors by the white balance gains.

In step S33, the signal processing unit 25 performs a YCbCr conversion process on the RGB image subjected to the white balance control process, and outputs the resultant YCbCr image. The process then comes to an end.

(Example Configurations of IC Chips of Imaging Apparatuses)

FIGS. 10 through 13 are diagrams showing example configurations of integrated circuit (IC) chips in cases where the imaging apparatus 11 is formed with IC chips.

Figure 10:
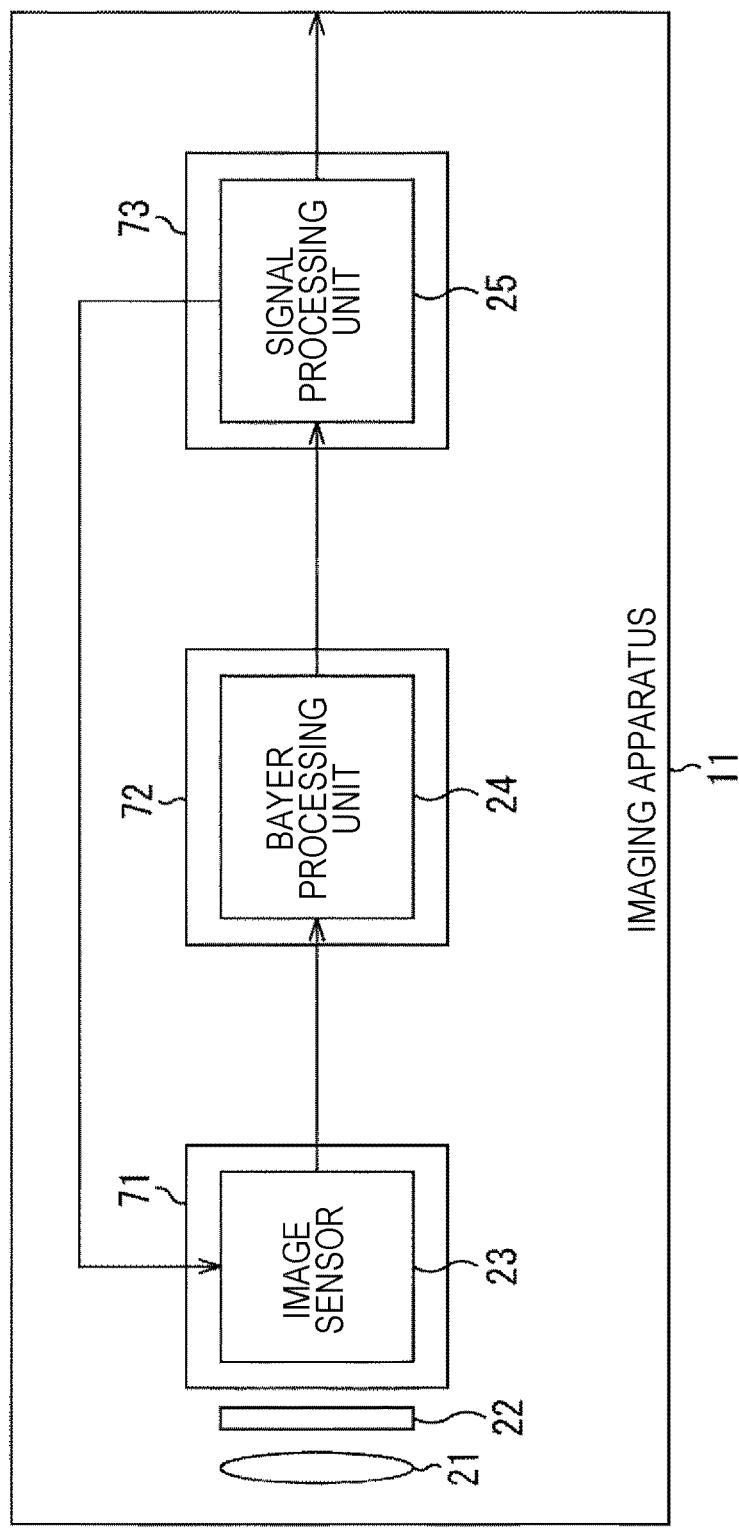
FIG. 10 is a diagram showing a first example configuration of IC chips of an imaging apparatus.

In a case where the imaging apparatus 11 is formed with IC chips, for example, the image sensor 23, the Bayer processing unit 24, and the signal processing unit 25 may be formed in different IC chips 71, 72, and 73, respectively, as shown in FIG. 10.

Figure 11:
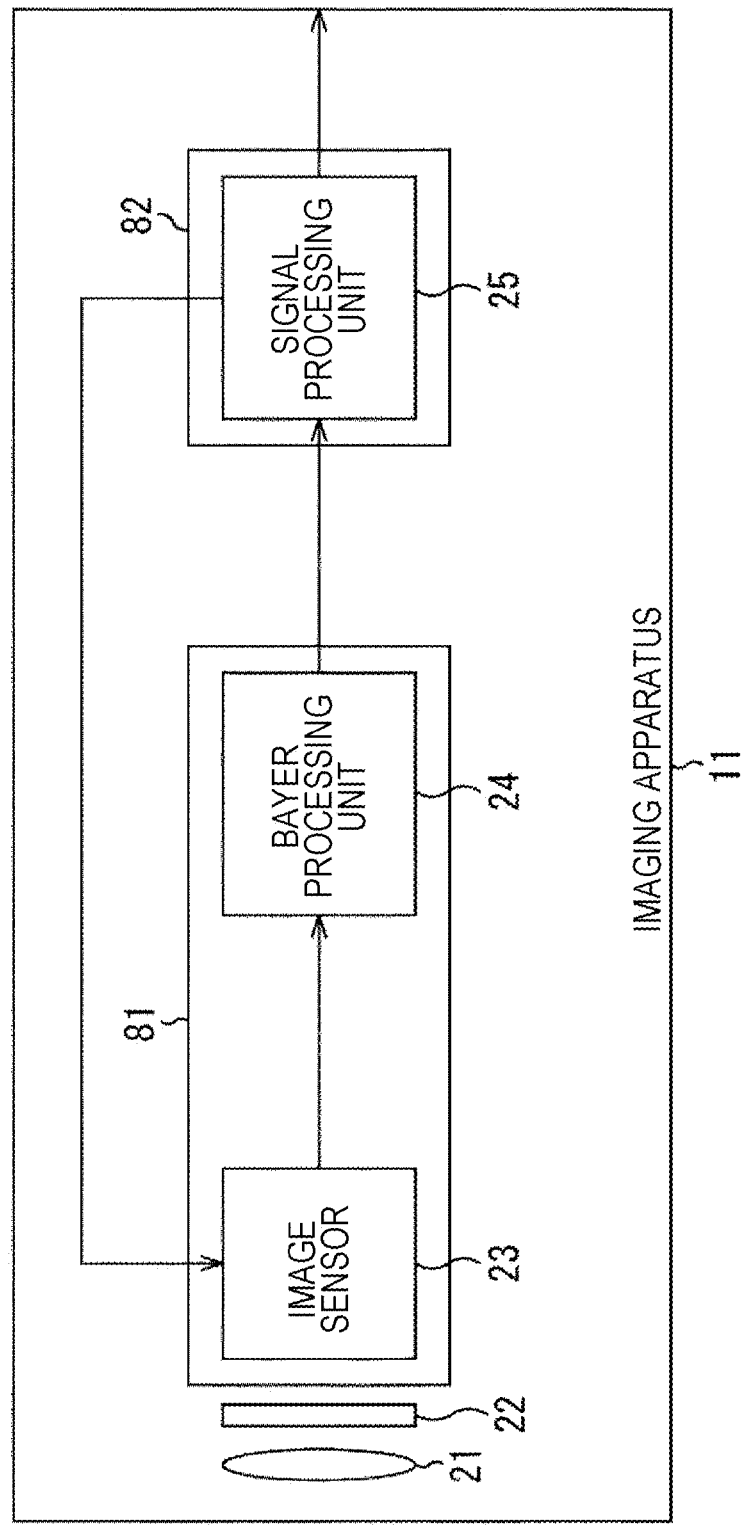
FIG. 11 is a diagram showing a second example configuration of IC chips of an imaging apparatus.

Also, as shown in FIG. 11, the image sensor 23 and the Bayer processing unit 24 may be formed in the same IC chip 81, and the signal processing unit 25 may be formed in a different IC chip 82 from the IC chip 81.

Figure 12:
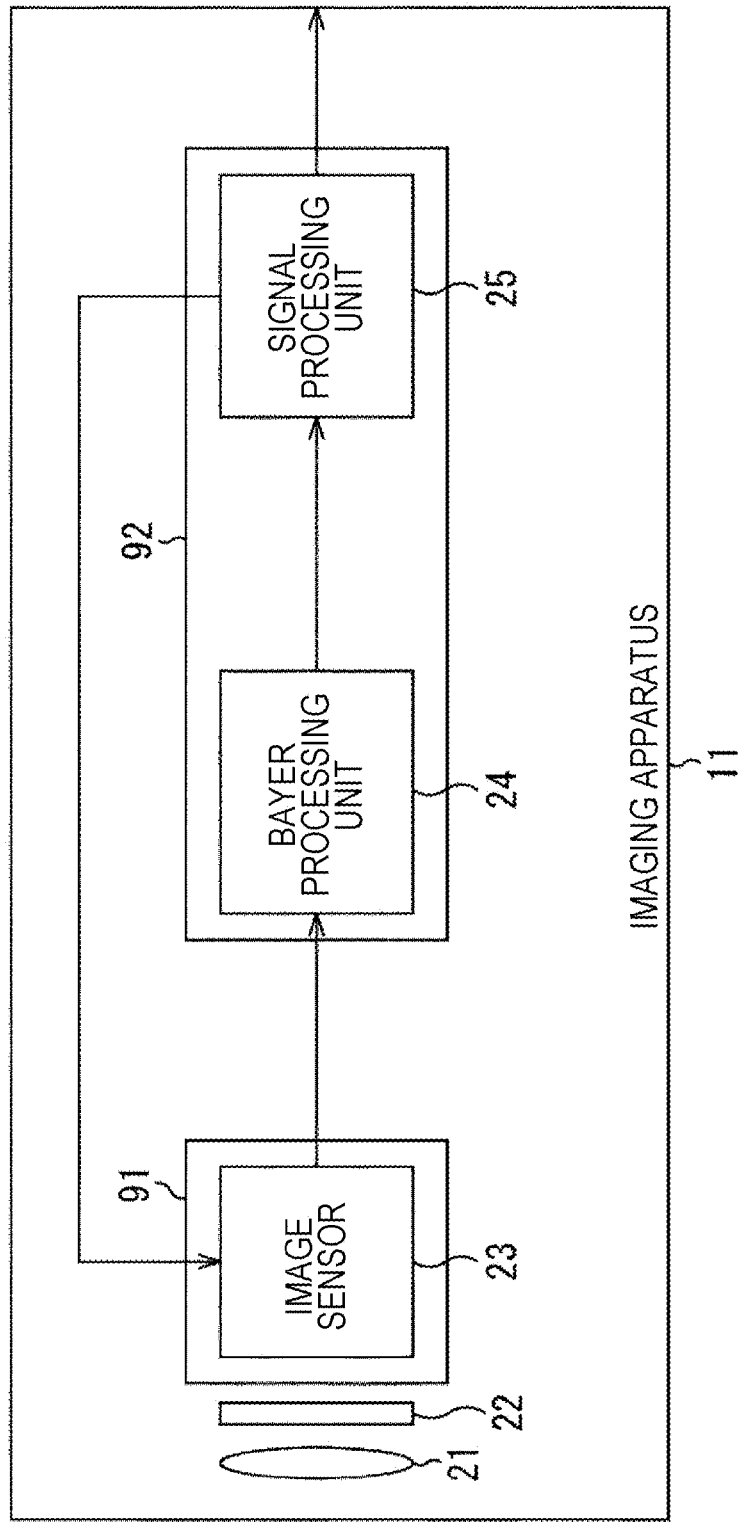
FIG. 12 is a diagram showing a third example configuration of IC chips of an imaging apparatus.
Figure 13:
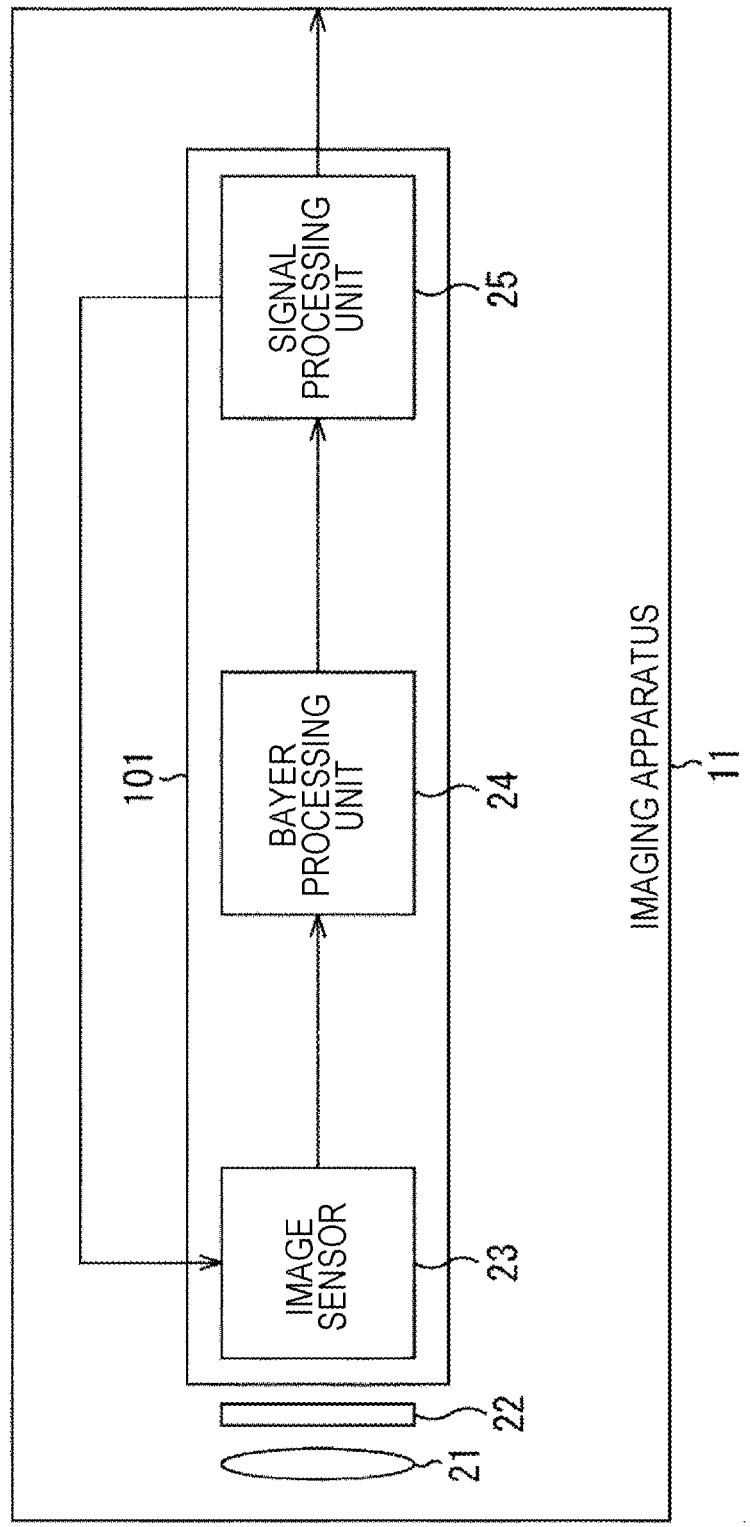
FIG. 13 is a diagram showing a fourth example configuration of IC chips of an imaging apparatus.

Further, as shown in FIG. 12, the image sensor 23 may be formed in a single IC chip 91, and the Bayer processing unit 24 and the signal processing unit 25 may be formed in a different IC chip 92 from the IC chip 91. Also, as shown in FIG. 13, the image sensor 23, the Bayer processing unit 24, and the signal processing unit 25 may be all formed in the same IC chip 101.

It should be noted that the lens 21 and the optical filter 22 are formed on the image sensor 23 in the IC chip 71 (81, 91, or 101) in which the image sensor 23 is formed.

As described above, when performing a Bayering process on a captured image in a non-Bayer pattern, the imaging apparatus 11 corrects the signal level of the visible light component $G_{WL}$ so that the signal level of the low-frequency component $(W_{+IR})_L$ of the captured image prior to the Bayering process becomes the same as the signal level of the pixel signals of the green pixels in the RGB image after the Bayering process. Thus, the imaging apparatus 11 can appropriately perform exposure control on a captured image in a non-Bayer pattern by performing exposure control in accordance with the RGB image subjected to the Bayering process, using the signal processing unit 25 designed for captured images in existing Bayer patterns.

The imaging apparatus 11 also performs a Bayering process by separating an infrared component from a captured image in a non-Bayer pattern that has been captured by the image sensor 23 and contains the infrared component. Thus, even in a case where a captured image in a non-Bayer pattern contains an infrared component, the imaging apparatus 11 can appropriately perform exposure control on the captured image in the non-Bayer pattern, using the signal processing unit 25 designed for captured images in existing Bayer patterns.

Further, when performing a Bayering process on a captured image in a non-Bayer pattern, the imaging apparatus 11 corrects the white balance among pixel signals R, G, and B so that the ratio among the signal levels of the visible light components $R_L$, $G_L$, and $B_L$ of the captured image prior to the Bayering process becomes the same as the ratio among the signal levels of the pixel signals of the respective colors in the RGB image after the Bayering process. Thus, the imaging apparatus 11 can appropriately perform white balance control on a captured image in a non-Bayer pattern by performing white balance control in accordance with the RGB image subjected to the Bayering process, using the signal processing unit 25 designed for captured images in existing Bayer patterns.

Second Embodiment (Example Configuration of a Second Embodiment of an Imaging Apparatus)

Figure 14:
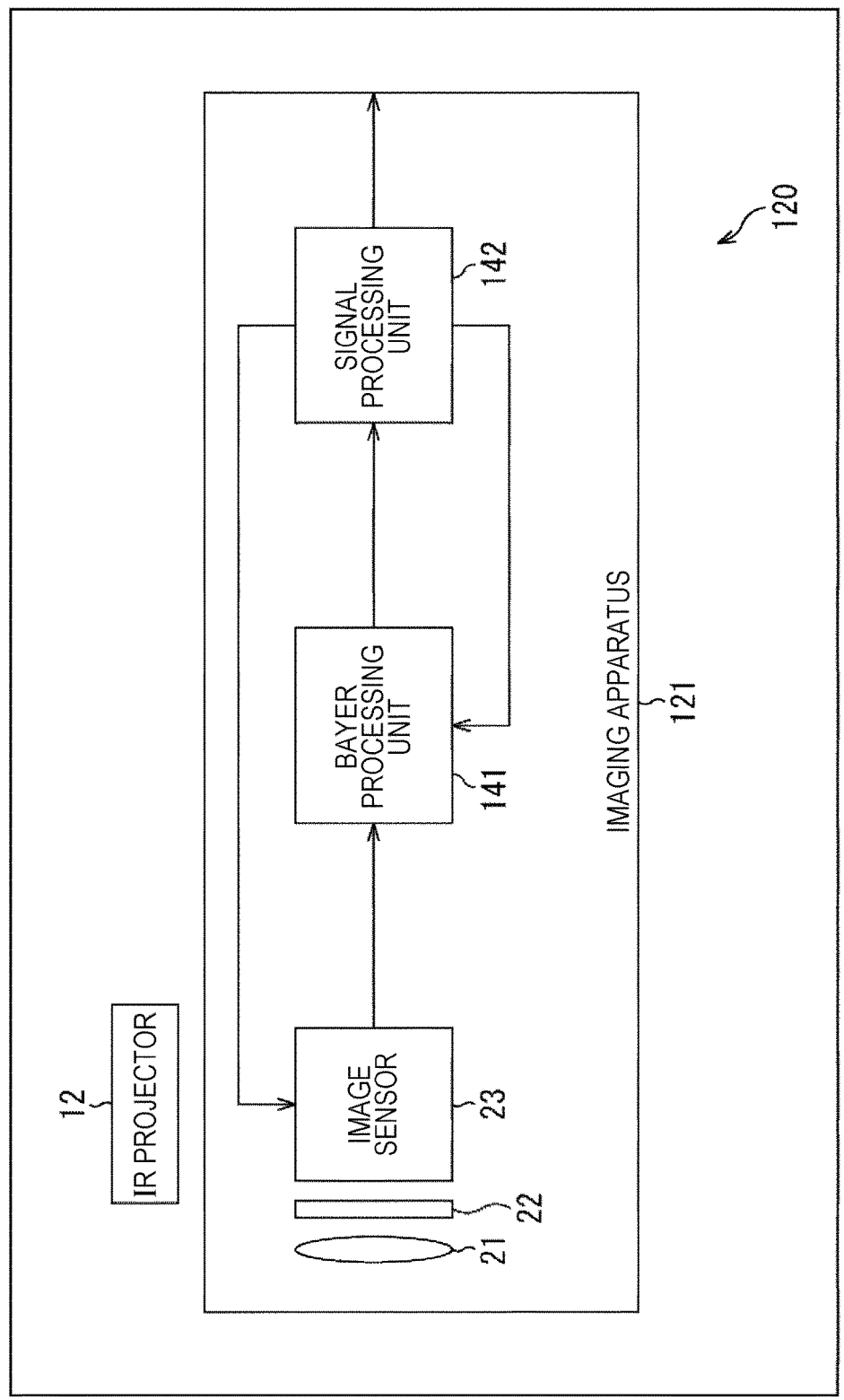
FIG. 14 is a block diagram showing an example configuration of a second embodiment of an imaging system that includes an imaging apparatus to which the present disclosure is applied.

FIG. 14 is a block diagram showing an example configuration of a second embodiment of an imaging system that includes an imaging apparatus to which the present disclosure is applied.

In the configuration shown in FIG. 14, the same components as those shown in FIG. 1 are denoted by the same reference numerals as those used in FIG. 1. The explanations that have already been made will not be repeated.

The configuration of the imaging system 120 in FIG. 14 differs from the imaging system 10 in FIG. 1 in that the imaging apparatus 11 is replaced with an imaging apparatus 121. Also, the configuration of the imaging apparatus 121 differs from the configuration of the imaging apparatus 11 in FIG. 1 in that the Bayer processing unit 24 is replaced with a Bayer processing unit 141, and the signal processing unit 25 is replaced with a signal processing unit 142. In the imaging apparatus 121, the Bayer processing unit 141 uses white balance gains calculated through a white balance control process performed by the signal processing unit 142.

Specifically, the Bayer processing unit 141 of the imaging apparatus 121 performs a Bayering process on a captured image in a non-Bayer pattern supplied from the image sensor 23, and generates an RGB image in a Bayer pattern. In this process, the Bayer processing unit 141 corrects white balance by using white balance gains supplied from the signal processing unit 142, and restores the original white balance. The Bayer processing unit 141 supplies the generated RGB image in a Bayer pattern to the signal processing unit 142.

The signal processing unit 142 is a signal processing unit designed for captured images in existing Bayer patterns. Using the RGB image supplied from the Bayer processing unit 141, the signal processing unit 142 performs signal processing, such as an exposure control process, a white balance control process, and a YCbCr conversion process, by the same methods as methods designed for captured images in Bayer patterns. The signal processing unit 142 supplies the image sensor 23 with shutter gain indicating the exposure obtained as a result of the exposure control process, and thus, controls the exposure of the captured image.

The signal processing unit 142 also supplies the Bayer processing unit 141 with the white balance gains calculated through the white balance control process. The signal processing unit 142 further outputs a YCbCr image obtained as a result of the white balance control process and the YCbCr conversion process.

(Example Configuration of the Bayer Processing Unit)

Figure 15:
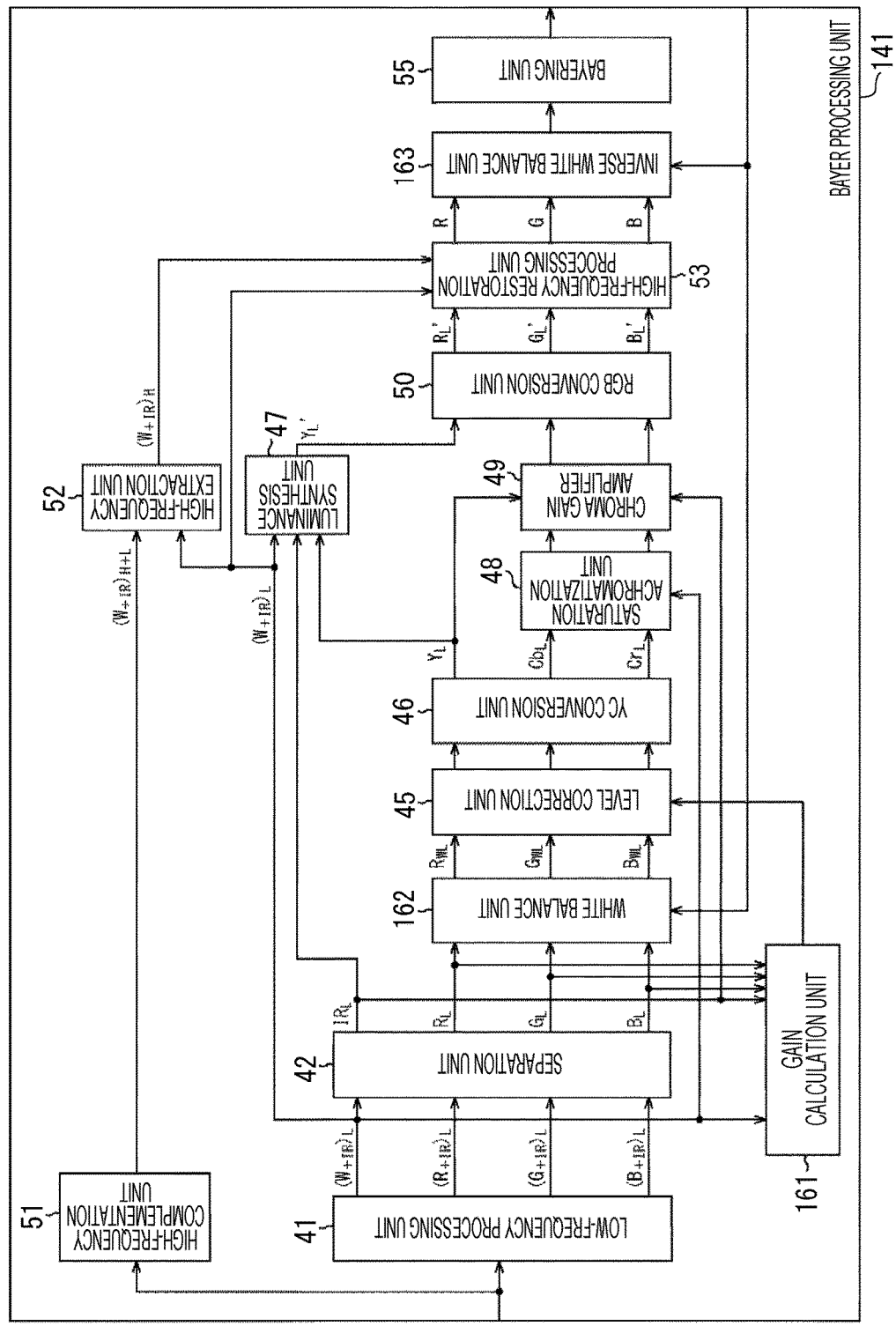
FIG. 15 is a block diagram showing an example configuration of the Bayer processing unit shown in FIG. 14.

FIG. 15 is a block diagram showing an example configuration of the Bayer processing unit 141 shown in FIG. 14.

In the configuration shown in FIG. 15, the same components as those shown in FIG. 4 are denoted by the same reference numerals as those used in FIG. 4. The explanations that have already been made will not be repeated.

The configuration of the Bayer processing unit 141 in FIG. 15 differs from the configuration of the Bayer processing unit 24 in FIG. 4 in that the gain calculation unit 43, the white balance unit 44, and the inverse white balance unit 54 are replaced with a gain calculation unit 161, a white balance unit 162, and an inverse white balance unit 163.

Like the gain calculation unit 43 in FIG. 4, the gain calculation unit 161 of the Bayer processing unit 141 calculates a correction gain $C_E$ as shown in the above mathematical expression (3), in accordance with a visible light component $G_L$ supplied from the separation unit 42 and a low-frequency component $(W_{+IR})_L$ supplied from the low-frequency processing unit 41. The gain calculation unit 161 supplies the correction gain $C_E$ to the level correction unit 45. However, unlike the gain calculation unit 43, the gain calculation unit 161 does not calculate white balance gains $C_{WR}$, $C_{WG}$, and $C_{WB}$, and the reciprocals of these white balance gains.

Like the white balance unit 44 in FIG. 4, the white balance unit 162 corrects the ratio among visible light components $R_L$, $G_L$, and $B_L$ supplied from the separation unit 42, by multiplying the respective visible light components $R_L$, $G_L$, and $B_L$ by the white balance gains supplied from the signal processing unit 142 in FIG. 14. The white balance unit 162 supplies the level correction unit 45 with the corrected visible light components $R_{WL}$, $G_{WL}$, and $B_{WL}$.

The inverse white balance unit 163 (the white balance control unit) calculates the reciprocals of the white balance gains supplied from the signal processing unit 142 in FIG. 1. The inverse white balance unit 163 multiplies the respective pixel signals R, G, and B supplied from the high-frequency restoration processing unit 53 by the calculated reciprocals of the white balance gains. As a result, the white balance among the pixel signals R, G, and B is controlled so that the ratio among the average values of the signal levels of the red, green, and blue pixel signals in one screen of the captured image output from the image sensor 23 prior to the Bayering process becomes the same as the ratio among the average values of the signal levels of the red, green, and blue pixel signals in one screen of the RGB image output from the Bayer processing unit 141 after the Bayering process. The inverse white balance unit 163 supplies the Bayering unit 55 with the pixel signals R, G, and B having the white balance controlled.

(Explanation of a Process to be Performed by the Imaging Apparatus)

Figure 16:
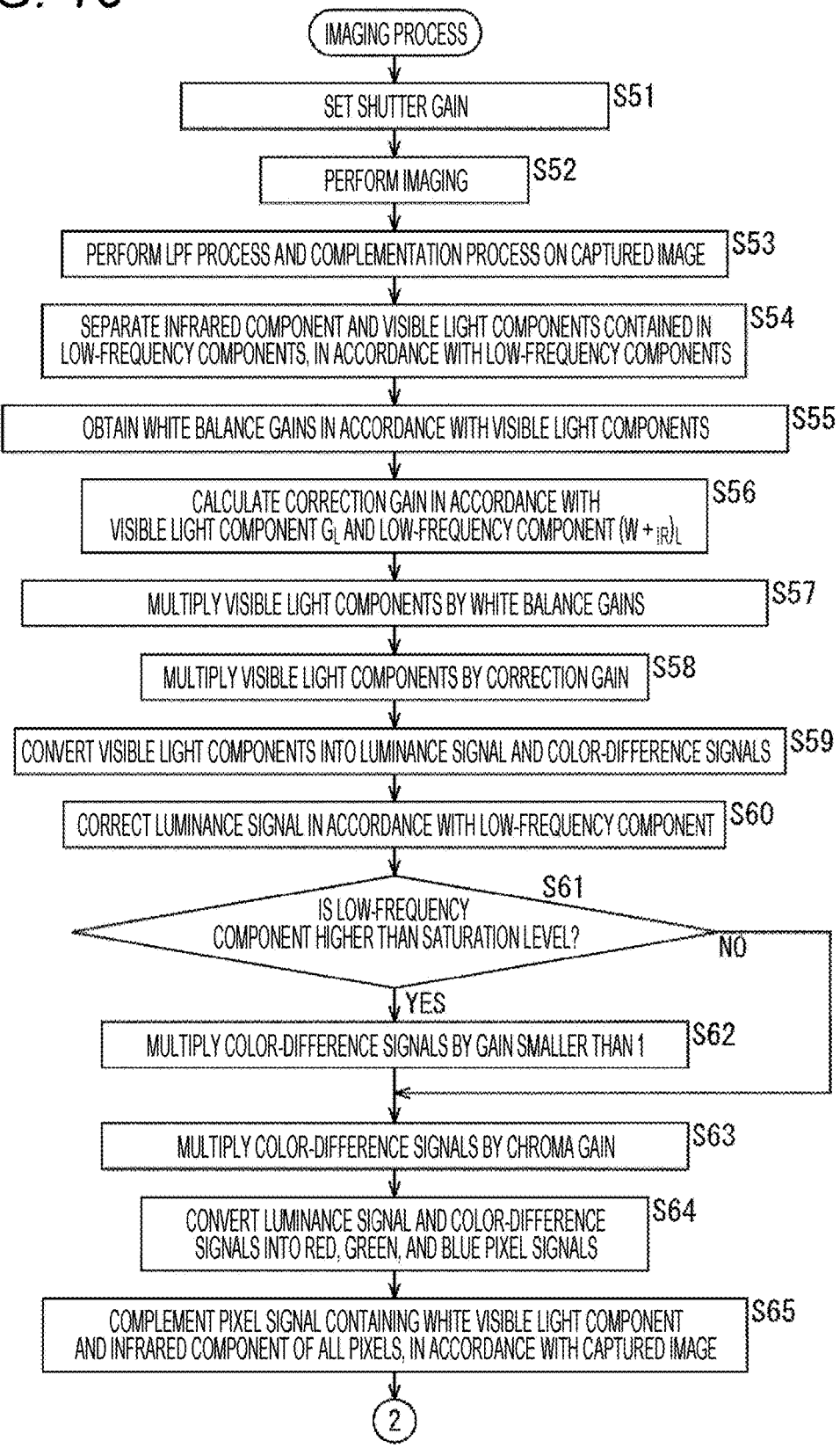
FIG. 16 is a flowchart for explaining an imaging process to be performed by the imaging apparatus shown in FIG. 14.
Figure 17:
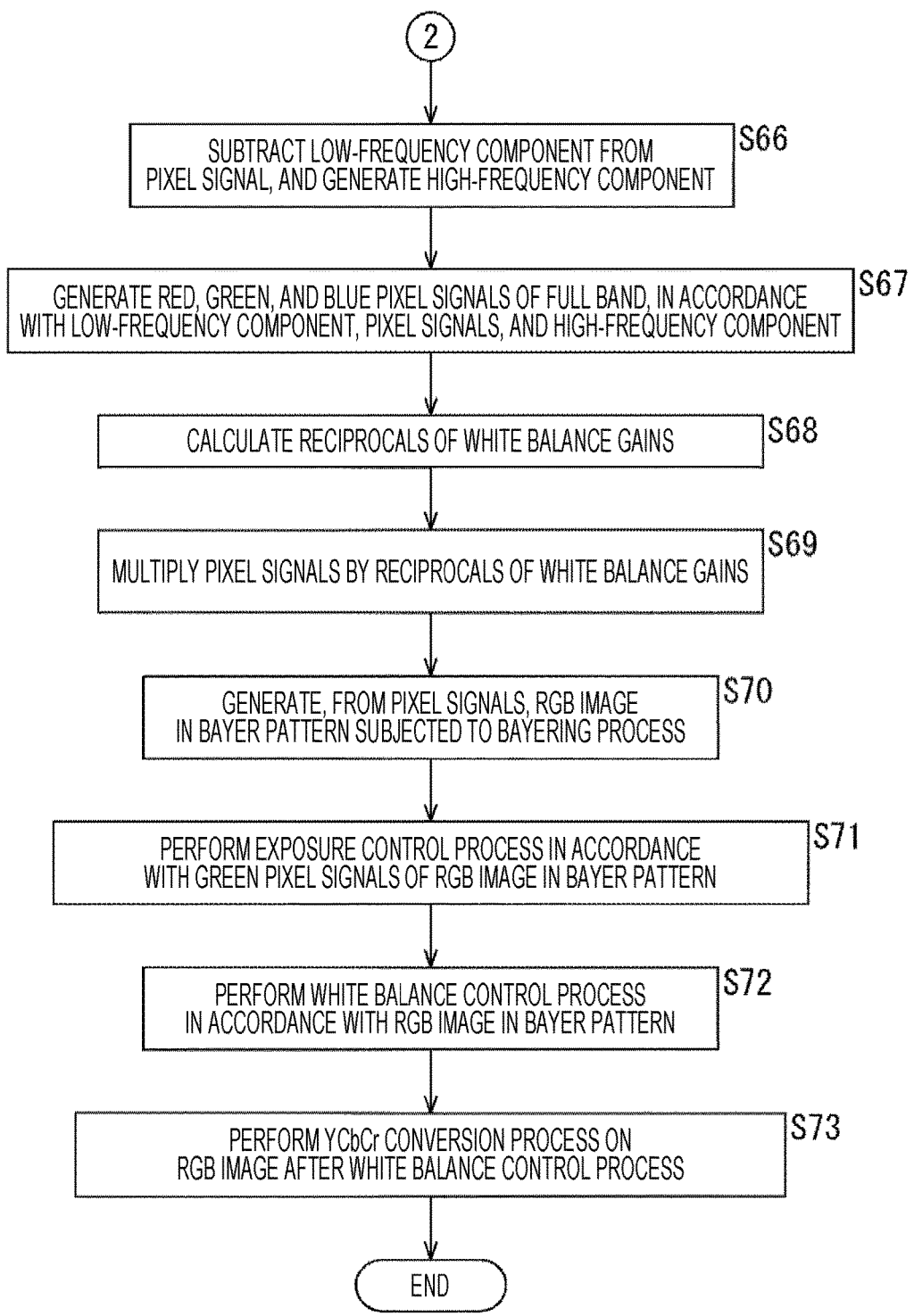
FIG. 17 is a flowchart for explaining the imaging process to be performed by the imaging apparatus shown in FIG. 14.

FIGS. 16 and 17 show a flowchart for explaining an imaging process to be performed by the imaging apparatus 121 shown in FIG. 14. This imaging process is to be performed for each captured image supplied from the image sensor 23, for example.

The processes in steps S51 through S54 in FIG. 16 are similar to the processes in steps S11 through S14 in FIG. 8, and therefore, explanation of them is not repeated herein.

In step S55, the white balance unit 162 (FIG. 15) of the Bayer processing unit 141 obtains the white balance gains supplied from the signal processing unit 142. It should be noted that, in the imaging process for the first captured image, any white balance gain has not been determined, and therefore, preset default values of white balance gains are regarded as the obtained white balance gains in step S55, for example.

The process in step S56 is similar to the process in step S17 in FIG. 8, and therefore, explanation thereof is not repeated herein. In step S57, the white balance unit 162 multiplies the respective visible light components $R_L$, $G_L$, and $B_L$ supplied from the separation unit 42, by the obtained white balance gains. The white balance unit 44 supplies the level correction unit 45 with the visible light components $R_{WL}$, $G_{WL}$, and $B_{WL}$ after the multiplication.

The processes in steps S58 through S67 are similar to the processes in steps S19 through S28 in FIGS. 8 and 9, and therefore, explanation of them is not repeated herein.

In step S68, the inverse white balance unit 163 obtains the white balance gains supplied from the signal processing unit 142, and calculates the reciprocals of the white balance gains. It should be noted that, in the imaging process for the first captured image, any white balance gain has not been calculated. Therefore, preset default values of white balance gains are regarded as the obtained white balance gains, for example, and the reciprocals of these white balance gains are calculated in step S68.

In step S69, the inverse white balance unit 163 multiplies the pixel signals R, G, and B supplied from the high-frequency restoration processing unit 53 by the calculated reciprocals of the white balance gains, and supplies the results to the Bayering unit 55.

The processes in steps S70 and S71 are similar to the processes in steps S30 and S31 in FIG. 9, and therefore, explanation of them is not repeated herein.

In step S72, the signal processing unit 142 performs a white balance control process in accordance with the RGB image in the Bayer pattern. The signal processing unit 142 also supplies the white balance unit 162 and the inverse white balance unit 163 with the white balance gains calculated through the white balance control process.

The process in step S73 is similar to the process in step S33 in FIG. 9, and therefore, explanation thereof is not repeated herein.

It should be noted that, in the second embodiment, the imaging apparatus 121 can also be formed with IC chips as in the first embodiment.

<Other Examples of Non-Bayer Patterns>

The present technology can also be applied to an image processing apparatus that performs a Bayering process on a captured image in a non-Bayer pattern that is not a captured image in an RGBW pixel array containing an infrared component. The current captured image to be subjected to the Bayering process may or may not contain an infrared component.

Figure 18:
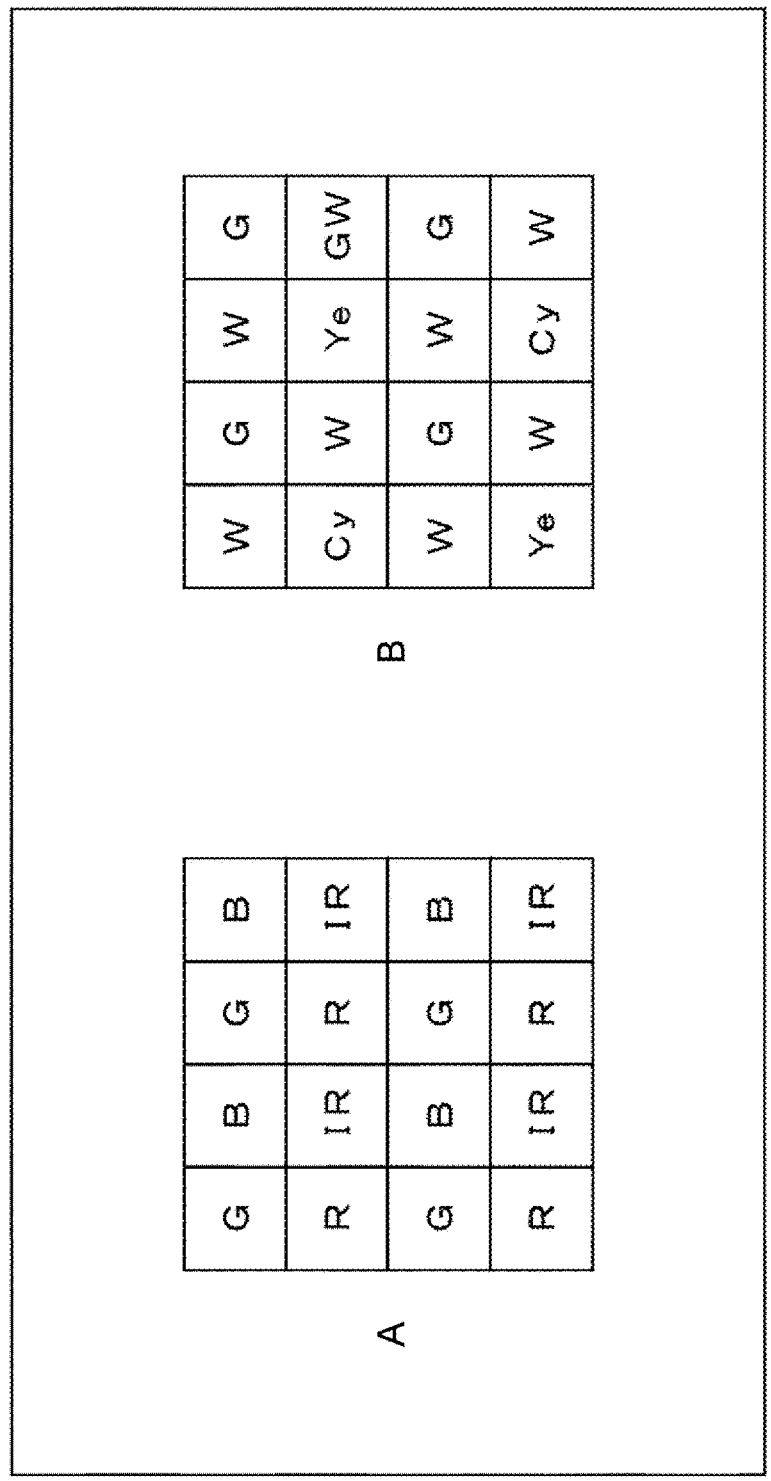
FIG. 18 is a diagram showing examples of non-Bayer patterns other than RGBW pixel arrays.
Figure 19:
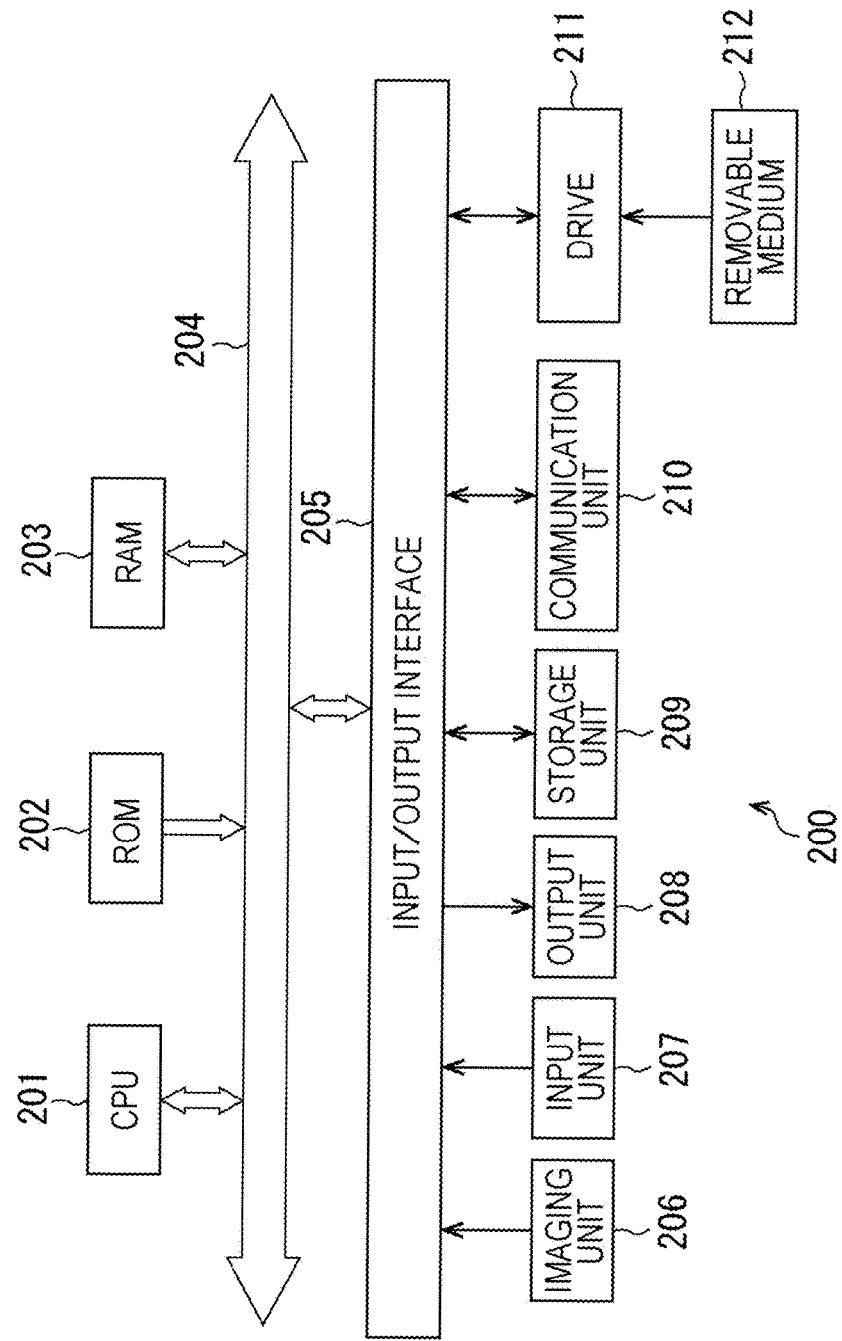
FIG. 19 is a block diagram showing an example configuration of the hardware of a computer.

FIG. 18 is a diagram showing examples of non-Bayer patterns other than RGBW pixel arrays.

The pixel array in A of FIG. 18 is an RGB+IR pixel array. An image in which each pixel corresponds to any of red (R) light, green (G) light, blue (B) light, and infrared (IR) light is to be formed. The pixel array in B of FIG. 18 is a complementary W pixel array. An image in which each pixel corresponds to light in any of white (W), yellow (Ye), cyan (Cy), and green (G) is to be formed.

The contents of a Bayering process vary depending on the type of the non-Bayer pattern, whether the captured image in the non-Bayer pattern contains an infrared component, and the like. Therefore, for example, in a Bayering process, any processing might not be performed to convert RGB signals into YCbCr signals or separate the infrared component. Further, the Bayer processing unit does not include the white balance unit 44 and the inverse white balance unit 54 in some cases.

However, where a Bayering process is performed, the signal levels of a captured image are corrected so that the signal level of the pixel with the highest sensitivity in the captured image prior to the Bayering process becomes the same as the signal level of each pixel to be used in exposure control to be performed on the image after the Bayering process. Thus, the signal processing unit 25 (142) can perform exposure control on a captured image in a non-Bayer pattern by an exposure control method designed for captured images in Bayer patterns.

Third Embodiment (Description of a Computer to which the Present Disclosure is Applied)

The above-described series of processes can be executed by hardware or by software. In a case where the series of processes are to be performed by software, the program that forms the software is installed into a computer. Here, the computer may be a computer incorporated into special-purpose hardware, or may be a general-purpose personal computer that can execute various kinds of functions, having various kinds of programs installed thereinto.

FIG. 19 is a block diagram showing an example configuration of the hardware of a computer that performs the above described series of processes in accordance with a program.

In a computer 200, a central processing unit (CPU) 201, a read only memory (ROM) 202, and a random access memory (RAM) 203 are connected to one another through a bus 204.

An input/output interface 205 is further connected to the bus 204. An imaging unit 206, an input unit 207, an output unit 208, a storage unit 209, a communication unit 210, and a drive 211 are connected to the input/output interface 205.

The imaging unit 206 is formed with a lens 21, an optical filter 22, an image sensor 23, and the like, and performs imaging. The input unit 207 is formed with a keyboard, a mouse, a microphone, and the like. The output unit 208 is formed with a display, a speaker, and the like. The storage unit 209 is formed with a hard disk, a nonvolatile memory, or the like. The communication unit 210 is formed with a network interface or the like. The drive 211 drives a removable medium 212, such as a magnetic disk, an optical disk, a magnetooptical disk, or a semiconductor memory.

In the computer 200 having the above described configuration, the CPU 201 loads a program stored in the storage unit 209 into the RAM 203 via the input/output interface 205 and the bus 204, for example, and executes the program, so that the above described series of processes are performed.

For example, the program to be executed by the computer 200 (CPU 201) can be recorded in the removable medium 212 as a packaged medium or the like to be provided. Alternatively, the program can be provided via a wired or wireless transmission medium, such as a local area network, the Internet, or digital satellite broadcasting.

In the computer 200, the program can be installed into the storage unit 209 via the input/output interface 205 when the removable medium. 212 is mounted on the drive 211. Also, the program can be received by the communication unit 210 through the wired or wireless transmission medium and can be installed into the storage unit 209. Alternatively, the program can be installed beforehand in the ROM 202 or the storage unit 209.

It should be noted that the program to be executed by the computer 200 may be a program for performing processes in chronological order in accordance with the sequence described in this specification, or may be a program for performing processes in parallel or performing a process when necessary, such as when there is a call.

In this specification, a system means an assembly of components (devices, modules (parts), and the like), and not all the components need to be provided in the same housing. In view of this, devices that are housed in different housings and are connected to one another via a network form a system, and one device having modules housed in one housing is also a system.

Also, the advantageous effects described in this specification are merely examples, and the advantageous effects of the present technology are not limited to them and may include other effects.

Furthermore, embodiments of the present disclosure are not limited to the above described embodiments, and various modifications may be made to them within the scope of the present disclosure.

For example, the signal processing unit 25 may perform exposure control in accordance with a luminance signal as the exposure control according to an exposure control method designed for captured images in Bayer patterns. In this case, the gain calculation unit 43 generates the average value of the luminance signal in one screen from the visible light components $R_L$, $G_L$, and $B_L$, and divides the average value $\text{Ave}(W_{+IR})_L$ by the average value of the luminance signal. In this manner, the gain calculation unit 43 calculates a correction gain $C_E$.

It should be noted that the present disclosure may also be embodied in the configurations described below.

(1)

An imaging apparatus including a level correction unit that corrects the signal level of a captured image in a non-Bayer pattern when a Bayering process is performed on the captured image, so that an earlier level that is the signal level of a pixel with the highest sensitivity in the captured image prior to the Bayering process becomes equal to a later level that is the signal level of a pixel to be used in exposure control on an image in a Bayer pattern that is the captured image after the Bayering process.

(2)

The imaging apparatus of (1), further including a correction gain calculation unit that calculates, in accordance with the earlier level and the later level, a correction gain by which the signal level of the captured image is to be multiplied to make the earlier level equal to the later level, in which the level correction unit multiplies the signal level of the captured image by the correction gain calculated by the correction gain calculation unit.

(3)

The imaging apparatus of (1) or (2), further including a white balance control unit that controls white balance of the captured image when the Bayering process is performed on the captured image in the non-Bayer pattern, so that the ratio among the signal levels of RGB in the captured image prior to the Bayering process becomes equal to the ratio among the signal levels of RGB in the captured image after the Bayering process.

(4)

The imaging apparatus of (3), further including a white balance unit that multiplies the captured image in the non-Bayer pattern by white balance gain when the Bayering process is performed on the captured image, in which the white balance control unit controls the white balance of the captured image by multiplying the captured image multiplied by the white balance gain, by the reciprocal of the white balance gain.

(5)

The imaging apparatus of (4), further including a white balance gain calculation unit that calculates the white balance gain in accordance with the captured image when the Bayering process is performed on the captured image in the non-Bayer pattern.

(6)

The imaging apparatus of (4), in which the white balance gain is calculated when predetermined signal processing is performed with the captured image after the Bayering process.

(7)

The imaging apparatus of any of (1) to (6), in which a signal of each pixel in the captured image in the non-Bayer pattern contains an invisible light component and a visible light component.

(8)

The imaging apparatus of (7), further including a separation unit that separates the invisible light component and the visible light component contained in the signal, in which the level correction unit corrects the signal level of the visible light component separated by the separation unit.

(9)

An imaging method including a step of correcting the signal level of a captured image in a non-Bayer pattern when an imaging apparatus performs a Bayering process on the captured image, so that an earlier level that is the signal level of the pixel with the highest sensitivity in the captured image prior to the Bayering process becomes equal to a later level that is the signal level of a pixel to be used in exposure control on an image in a Bayer pattern that is the captured image after the Bayering process.

(10)

A program for causing a computer to function as a level correction unit that corrects the signal level of a captured image in a non-Bayer pattern when a Bayering process is performed on the captured image, so that an earlier level that is the signal level of the pixel with the highest sensitivity in the captured image prior to the Bayering process becomes equal to a later level that is the signal level of a pixel to be used in exposure control on an image in a Bayer pattern that is the captured image after the Bayering process.

REFERENCE SIGNS LIST

11 Imaging apparatus
42 Separation unit
43 Gain calculation unit
44 White balance unit
45 Level correction unit
54 Inverse white balance unit
121 Imaging apparatus
162 White balance unit

The invention claimed is:

1. An imaging apparatus comprising
a level correction unit configured to correct a signal level of a captured image in a non-Bayer pattern when a Bayering process is performed on the captured image, to make an earlier level equal to a later level, the earlier level being a signal level of a pixel with the highest sensitivity in the captured image prior to the Bayering process, the later level being a signal level of a pixel to be used in exposure control on an image in a Bayer pattern, the image in the Bayer pattern being the captured image after the Bayering process.

2. The imaging apparatus according to claim 1, further comprising
a correction gain calculation unit configured to calculate, in accordance with the earlier level and the later level, a correction gain by which the signal level of the captured image is to be multiplied to make the earlier level equal to the later level,
wherein the level correction unit multiplies the signal level of the captured image by the correction gain calculated by the correction gain calculation unit.

3. The imaging apparatus according to claim 1, further comprising
a white balance control unit configured to control white balance of the captured image when the Bayering process is performed on the captured image in the non-Bayer pattern, to make a ratio among signal levels of RGB in the captured image prior to the Bayering process becomes equal to a ratio among signal levels of RGB in the captured image after the Bayering process.

4. The imaging apparatus according to claim 3, further comprising
a white balance unit configured to multiply the captured image in the non-Bayer pattern by white balance gain when the Bayering process is performed on the captured image,
wherein the white balance control unit controls the white balance of the captured image by multiplying the captured image multiplied by the white balance gain, by a reciprocal of the white balance gain.

5. The imaging apparatus according to claim 4, further comprising
a white balance gain calculation unit configured to calculate the white balance gain in accordance with the captured image when the Bayering process is performed on the captured image in the non-Bayer pattern.

6. The imaging apparatus according to claim 4, wherein the white balance gain is calculated when predetermined signal processing is performed with the captured image after the Bayering process.

7. The imaging apparatus according to claim 1, wherein a signal of each pixel in the captured image in the non-Bayer pattern contains an invisible light component and a visible light component.

8. The imaging apparatus according to claim 7, further comprising
a separation unit configured to separate the invisible light component and the visible light component contained in the signal,
wherein the level correction unit corrects a signal level of the visible light component separated by the separation unit.

9. An imaging method comprising
a step of correcting a signal level of a captured image in a non-Bayer pattern when an imaging apparatus performs a Bayering process on the captured image, to make an earlier level equal to a later level, the earlier level being a signal level of a pixel with the highest sensitivity in the captured image prior to the Bayering process, the later level being a signal level of a pixel to be used in exposure control on an image in a Bayer pattern, the image in the Bayer pattern being the captured image after the Bayering process.

10. A non-transitory computer-readable storage medium storing a program for causing a computer to function as a level correction unit configured to correct a signal level of a captured image in a non-Bayer pattern when a Bayering process is performed on the captured image, to make an earlier level equal to a later level, the earlier level being a signal level of a pixel with the highest sensitivity in the captured image prior to the Bayering process, the later level being a signal level of a pixel to be used in exposure control on an image in a Bayer pattern, the image in the Bayer pattern being the captured image after the Bayering process.

* * * * *